(12) United States Patent
Shimizu

(10) Patent No.: US 7,456,920 B2
(45) Date of Patent: Nov. 25, 2008

(54) METHOD OF MANUFACTURING ELECTRO-OPTICAL DEVICE, DEVICE FOR MANUFACTURING THE SAME, ELECTRO-OPTICAL DEVICE AND ELECTRONIC APPARATUS

(75) Inventor: Yuichi Shimizu, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 555 days.

(21) Appl. No.: 11/209,857

(22) Filed: Aug. 24, 2005

(65) Prior Publication Data
US 2006/0087604 A1    Apr. 27, 2006

(30) Foreign Application Priority Data
Oct. 22, 2004    (JP)    ............... 2004-307747

(51) Int. Cl.
G02F 1/1337    (2006.01)
(52) U.S. Cl. ...................................... 349/125
(58) Field of Classification Search ................ 349/125, 349/123, 187
See application file for complete search history.

(56) References Cited

U.S. PATENT DOCUMENTS

| 5,268,781 | A | 12/1993 | Shigeta et al. | |
| 6,816,219 | B2* | 11/2004 | Akagi et al. | 349/125 |
| 7,002,653 | B2 | 2/2006 | Taniguchi et al. | |

FOREIGN PATENT DOCUMENTS

| JP | A-52-108843 | 9/1977 |
| JP | A-53-086235 | 7/1978 |
| JP | A-61-028928 | 2/1986 |
| JP | A-61-267027 | 11/1986 |
| JP | A-06-186563 | 7/1994 |
| JP | A-2002-229029 | 8/2002 |
| JP | A-2002-287152 | 10/2002 |
| JP | A-2003-129225 | 5/2003 |
| KR | 432850 B1 | 9/2002 |

* cited by examiner

*Primary Examiner*—Thoi V Duong
(74) *Attorney, Agent, or Firm*—Oliff & Berridge, PLC

(57) ABSTRACT

A method of manufacturing an electro-optical device, the electro-optical device having a pair of substrates with an electro-optical material interposed therebetween, the method includes forming electrodes on a substrate surface of at least one substrate of the pair of substrates opposite to the electro-optical material so as to apply a predetermined voltage to the electro-optical material for every pixel; forming a base film of an alignment film made of an inorganic material on the electrodes by performing a first PVD method while setting an angle which a scattering direction of the inorganic material forms with respect to the substrate surface to one value or a plurality of values such that the electrode does not generate a blocked portion at one location with respect to the scattering direction; and forming the alignment film made of the inorganic material on the base film by fixing the angle to a predetermined value different from the value set by the first PVD method or performing a second PVD method with a film forming condition different from the first PVD method.

10 Claims, 12 Drawing Sheets

METHOD OF MANUFACTURING ELECTRO-OPTICAL DEVICE, DEVICE FOR MANUFACTURING THE SAME, ELECTRO-OPTICAL DEVICE AND ELECTRONIC APPARATUS

This application claims the benefit of Japanese Patent Application No. 2004-307747, filed Oct. 22, 2004. The entire disclosure of the prior application is hereby incorporated by reference herein in its entirety.

BACKGROUND OF THE INVENTION

1. Technical Field

The present invention relates to a method of manufacturing an electro-optical device, such as a liquid crystal device, to a device for manufacturing the same, and to an electronic apparatus, such as a liquid crystal projector, having an electro-optical device manufactured by the method of manufacturing an electro-optical device.

2. Related Art

As disclosed in Japanese Unexamined Patent Application Publication Nos. 6-186563 and 2003-129225, in an electro-optical device manufactured by such a method of manufacturing an electro-optical device, an alignment control of an electro-optical material interposed between a pair of substrates is performed by an inorganic alignment film formed on a substrate surface of at least one substrate of the pair of substrates opposite to the electro-optical material. When the electro-optical device is manufactured, the inorganic alignment film is formed by an oblique deposition method.

According to a technology disclosed in Japanese Unexamined Patent Application Publication No. 6-186563, after electrodes or the like are formed on the substrate surface, an inorganic alignment film is formed by an oblique deposition method within the same manufacturing device. At this time, an angle formed by the substrate surface and a scattering direction or progressing direction of the inorganic material with respect to the substrate surface is fixed to two angles, and the inorganic alignment film is formed.

According to a technology disclosed in Japanese Unexamined Patent Application Publication No. 2003-129225, when the inorganic alignment film is formed on the substrate surface using the oblique deposition method, the direction of the vapor flow of the inorganic material is controlled so as to make a deposition angle of the inorganic material to the substrate surface and a thickness of the inorganic alignment film uniform.

However, on a base surface of an inorganic alignment film provided on the substrate surface, a step is formed due to pixel electrodes or the like. In addition, when the inorganic alignment film is formed, a portion blocked by the step is generated on the base surface in a scattering direction of the inorganic material with respect to the substrate surface. As a result, it may be difficult for the inorganic materials to be attached to the portion or the inorganic materials may not be attached to the portion. Therefore, in the portion of the inorganic alignment film corresponding to the step of the base surface, a restraining force of the electro-optical material becomes weak, causing light to possibly leak, thereby deteriorating the quality of a display image in the electro-optical device.

In addition, when the film forming speed of the inorganic alignment film is reduced such that columnar structures made of inorganic materials are arranged at a predetermined angle with respect to the substrate surface, it becomes difficult to increase the thickness of the inorganic alignment film. Since the inorganic alignment film has small film density, when the film thickness is small, the electro-optical material or the like may come into contact with the pixel electrodes, which generates a short circuit.

Further, the inorganic alignment film is formed of an inorganic material which easily absorbs moisture, such as, for example, silica ($SiO_2$). Therefore, when the thickness of the inorganic alignment film is small, the moisture absorbed into the inorganic alignment film is dispersed into the inorganic alignment film, causing the moisture to permeate into the pixel electrodes for forming the base of the inorganic alignment film or pixel switching elements for driving the pixel electrodes, thereby damaging the pixel electrodes or the like.

As a result, a yield in a process of manufacturing the electro-optical device decreases and it is difficult to increase a life span of the electro-optical device.

SUMMARY

An advantage of the invention is that it provides a manufacturing method and a manufacturing device of an electro-optical device, in which the electro-optical device capable of performing high quality image display and increasing a life span can be manufactured and a yield can be improved, an electro-optical device manufactured by the manufacturing method, and an electronic apparatus, such as a liquid crystal projector, having the electro-optical device.

According to a first aspect of the invention, a method of manufacturing an electro-optical device, the electro-optical device having a pair of substrates with an electro-optical material interposed therebetween, includes forming electrodes on a substrate surface of at least one substrate of the pair of substrates opposite to the electro-optical material so as to apply a predetermined voltage to the electro-optical material for every pixel; forming a base film of an alignment film made of an inorganic material on the electrodes by performing a first PVD method while setting an angle which a scattering direction of the inorganic material forms with respect to the substrate surface to one value or a plurality of values such that the electrode does not generate a blocked portion at one location with respect to the scattering direction; and forming the alignment film made of the inorganic material on the base film by fixing the angle to a predetermined value different from the value set by the first PVD method or performing a second PVD method with a film forming condition different from the first PVD method.

In an electro-optical device manufactured by the method of manufacturing an electro-optical device according to a first aspect, an electro-optical material, for example, liquid crystal is injected between a pair of substrates. In a state in which the electro-optical device is not driven, the electro-optical material enters a predetermined alignment state between the pair of substrates by the alignment film made of the inorganic material, that is, a surface shape effect of the inorganic alignment film. When the electro-optical device is driven, a voltage according to an image signal is applied to the electro-optical material through the electrodes for every pixel, so that the alignment state of the electro-optical material changes, thereby modulating light incident from the light source. In addition, the light modulated by the electro-optical material is emitted as display light, so that image display is performed.

In the method of manufacturing an electro-optical device according to the first aspect, electrodes, for example, pixel electrodes are formed on a substrate surface of one substrate of the pair of substrates opposite to the electro-optical material so as to apply a predetermined voltage to the electro-optical material for every pixel. Here, the pixel electrodes are formed on an uppermost layer of a laminated structure in which the wiring line for driving the pixel electrodes or the driving elements are provided. Since the pixel electrode is formed in an island or stripe shape in a predetermined pattern for every pixel, a step generated according to the thickness of the pixel electrode in a direction vertical to the substrate surface is formed on the outermost surface of the laminated structure.

In the laminated structure, a plurality of conductive films are formed so as to form at least a portion of the wiring lines or driving elements, and interlayer insulating films are formed so as to insulate the conductive films formed on different layers. In addition, the pixel electrodes are formed in a state in which they are insulated by the wiring lines or the driving elements and the interlayer insulating films.

Therefore, if the step according to the thickness of the conductive film in a direction vertical to the substrate surface is generated on the surface of the bottom layer of the laminated structure, the shape of the step is reflected to the surface shape of each of the upper layers, so that the step is generated on the surface of the pixel electrode or the surface of the interlayer insulating film exposed to the outermost surface of the laminated structure between the pixel electrodes on the substrate surface in plan view.

For example, on the substrate surface of the other substrate of the pair of substrates opposite to the electro-optical material, the counter electrode is formed so as to be opposite to the plurality of pixel electrodes serving as the electrodes.

Next, in the forming of the base film, the first PVD (physical vapor deposition) method, for example, the oblique deposition method or the ion beam sputtering method is performed with respect to the substrate where the pixel electrodes are formed, so that the base film of the alignment film is formed on the substrate surface where the pixel electrodes are formed. For example, when the first PVD method is performed as the oblique deposition method, the vapor flow of the inorganic material, such as silica ($SiO_2$) is generated, and the substrate surface where the pixel electrodes are formed is arranged in a progressing direction of the vapor flow of the inorganic material, which is 'the scattering direction of the inorganic material'. At this time, an angle which the progressing direction of the vapor flow of the inorganic material forms with the substrate surface is fixed to a right angle such that the portion blocked by the step is not generated at one location with respect to the progressing direction of the vapor flow of the inorganic material to the substrate surface, on the outermost surface of the above-mentioned laminated structure provided on the substrate surface. Alternatively, in this case, the angle, which the progressing direction of the vapor flow of the inorganic material forms with respect to the substrate surface, may be continuously changed to the plurality of values.

In addition, the vapor flow of the inorganic material comes into contact with the outermost surface of the laminated structure, so that the respective pixel electrodes are buried, and the base film is formed such that the thickness of the film on the pixel electrode becomes a predetermined value. More specifically, arranging the columnar structures made of inorganic materials on the substrate surface forms the base film. In the base film, the angle, which the columnar structures form with respect to the substrate surface, corresponds to the angle, which the progressing direction of the vapor flow of the inorganic material forms with respect to the substrate surface. In addition, an angle that the columnar structures form with respect to the substrate surface is set to the right angle or angles other than the right angle and the columnar structures are vertically or obliquely arranged with respect to the substrate surface, so that the film of the inorganic material is allowed to grow, and the base film is formed.

Therefore, on the substrate surface, the columnar structures can be arranged in the vicinity of the step on the outermost surface of the above-mentioned laminated structure without the gap, and the step is covered with the base film. The step shape to which the step generated on the outermost surface of the laminated structure is reflected is generated on the surface of the base film, but the step of the surface of the base film becomes smaller as compared with the step generated on the outermost surface of the laminated structure. Thereby, the step of the outermost surface of the laminated structure is markedly alleviated on the surface of the base film so as to planarize it.

In addition, it is possible to increase the film forming speed of the base film as compared with the film forming speed of the alignment film in the forming of the alignment film. In particular, the base film is not concerned with the alignment function of the alignment film. Therefore, since it is not necessary that a strict control be performed with respect to a growth direction of the base film on the substrate surface in the same manner as forming the alignment film, the complicated manufacturing process becomes unnecessary. As a result, the film forming speed is increased, the base film having a large thickness can be easily formed, and the base film can be cheaply formed of a film having a large density, that is, a dense film.

Further, the first PVD method in the forming of the base film and the second PVD method in the forming of the alignment film are performed by the oblique deposition method, so that the forming of the base film and the forming of the alignment film can be performed by the same manufacturing device.

After that, in the forming of the alignment film, the oblique deposition method is performed as the second PVD method, and the alignment film made of an inorganic material, such as silica ($SiO_2$), is formed.

In this case, the substrate surface where the base film is formed is arranged by fixing an angle, which the progressing direction of the vapor flow of the inorganic material, which is the scattering direction of the inorganic material, forms with respect to the substrate surface, to a predetermined value different from the first PVD method. At this time, in order to obtain the surface shape effect that can makes the alignment control performed in the alignment film, preferably, the film forming speed in the forming of the alignment film is decreased as compared with the film forming speed of the base film in the forming of the base film, and thus the columnar structures are uniformly arranged such that they form a predetermined angle with respect to the substrate surface.

In this case, the angle which the scattering direction of the inorganic material forms with respect to the substrate surface is fixed to a predetermined value which is equal to any one of angles of the one value or the plurality of values used by the first PVD method (for example, vertical with respect to the substrate surface), and the second PVD method is performed with the film forming condition different from the first PVD method. In this case, as described above, in order that the columnar structures are uniformly arranged such that they form a predetermined angle with respect to the substrate surface, the film forming speed as the film forming condition is changed like decreasing the film forming speed or the like.

As described above, on the surface of the base film, the step does not exist or decreases. That is, since the surface of the base film becomes flat, it is possible to prevent the portion blocked by the step with respect to the progressing direction of the vapor flow from being generated on the surface of the base film in the forming of the alignment film. Therefore, the vapor flow of the inorganic material comes into contact with the surface of the base film, and thus the columnar structures made of the inorganic materials are uniformly arranged on the base film such that the columnar structures form the predetermined angle with respect to the substrate surface. Alternatively, even though the surface step resulting from the electrodes are not improved by the base film, since the surface step is covered with the base film, the defects of the alignment film generated due to the surface step are compensated by the base film. In other words, if denseness, water resistance or moisture resistance in the alignment film are increased by the base film, even though the film quality is deteriorated in a blocked portion when the alignment film itself is formed, a problem does not occur.

In the alignment film formed in this way, the gap between the columnar structures becomes increased as compared with the base film, and the density of the alignment film becomes decreased as compared with the base film. Here, the film forming speed of the alignment film in the forming of the alignment film becomes smaller than the film forming speed of the base film in the forming of the base film, but the alignment film may be formed with a thickness that the surface shape effect can be obtained. Therefore, even though the film forming speed is small, the alignment film can be easily formed.

In addition, after the forming of the alignment film, the pair of substrates are bonded to each other, and the electro-optical device is then formed by interposing the electro-optical material between the pair of substrates.

In the forming of the alignment film, the second PVD method can be performed by the ion beam sputtering method. In addition, in addition to one substrate of the pair of substrates where the pixel electrodes are formed, the base film is formed on the substrate surface of the other substrate opposite to the electro-optical material through the same sequence as the forming of the base film, and the alignment film may be formed through the same sequence as the forming of the third process by forming the alignment film through the same sequence as the forming of the alignment film or not forming the base film. At this time, as described above, when the counter electrode is formed on the other substrate, the alignment film is formed on the counter electrode.

Therefore, in the electro-optical device manufactured by the method of manufacturing an electro-optical device according to the first aspect described above, the uniform surface shape effect can be obtained on the alignment film, and it is possible to prevent the alignment defects from being generated due to the alignment restraining force being locally weak. As a result, in the electro-optical device, it is possible to prevent the light from leaking due to alignment defects of the electro-optical material. Therefore, high quality image display can be performed.

In addition, in the method of manufacturing an electro-optical device according to the first aspect, it is possible to increase the thickness of the base film or form the base film with a dense film. Therefore, it is prevented that the pixel electrode comes into contact with the electro-optical material, and it is prevented that the moisture absorbed into the alignment film having the small thickness and density is dispersed from the alignment film to the base film and then permeates into the pixel electrodes. Therefore, in the method of manufacturing the electro-optical device according to the first aspect, the yield can be increased, and the water resistance and the moisture resistance can be increased, so that it is possible to increase the life span of the electro-optical device.

Preferably, the forming of the alignment film includes forming an alignment film having smaller density than the base film.

According to this aspect, the base film is formed of a dense film, and the thickness of the base film is increased. As a result, it is possible to prevent the pixel electrodes from coming into contact with the electro-optical material, and it is possible to increase the water resistance and the moisture resistance in the electro-optical device manufactured by the method of manufacturing the electro-optical device.

In addition, the base film can be formed by increasing the film forming speed thereof. Therefore, in order to perform the alignment control of the electro-optical material, the base film is additionally provided with respect to the alignment film, the film forming speed of the base film is adjusted, and the film forming time of the inorganic material for forming the alignment film and the base film can be markedly reduced.

Preferably, the forming of the alignment film includes forming the alignment film at a lower speed than the forming of the base film.

According to this aspect, the film forming speed of the alignment film decreases as compared with the film forming speed of the base film, the columnar structures made of inorganic materials are uniformly arranged on the base film such that they form a predetermined angle with respect to the substrate surface, and the uniform surface shape effect can be obtained on the alignment film. In particular, it is possible to markedly reduce the film forming time necessary for forming the alignment film and the base film having the desired water resistance or moisture resistance. In addition, since the water resistance or moisture resistance can be obtained by the base film separately provided with respect to the alignment film, the alignment film can be formed of a high quality film and the life span of the alignment film can be increased.

Preferably, the forming of the alignment film includes forming the alignment film with the same inorganic material as the base film.

According to this aspect, it is possible to form a high quality alignment film which is integrated with the base film made of the same inorganic material. Even though the forming material of the alignment film is not the same as the forming material of the base film, the high quality alignment film can be formed with an inorganic material similar to that of the base film, and the alignment film can be formed with an inorganic material different from the forming material of the base film.

Preferably, the forming of the base film includes performing the first PVD method by setting the one angle or the plurality of angles to a right angle.

According to this aspect, when the oblique deposition method is performed as the first PVD method, the inorganic material can be deposited on the outermost surface of the laminated structure on the substrate surface where the pixel electrode is formed as the electrode such that a portion blocked by the step is not generated with respect to the progressing direction of the vapor flow of the inorganic material to the substrate surface, on the outermost surface of the above-mentioned laminated structure. Therefore, the base film can be formed by arranging the columnar structures made of the inorganic materials even in the vicinity of the step of the outermost surface of the above-mentioned laminated structure. In addition, the base film can be formed as a dense film by increasing the thickness of the film in a state in which the surface of the base film is flat.

According to this aspect, the 'vertical' means that the angle which the progressing direction of the vapor flow of the inorganic material which is 'a scattering direction of the inorganic material' forms with respect to the substrate surface is vertical and that the angle is formed such that the blocked portion generated according to the step on the outermost surface of the above-mentioned laminated structure does not generate.

Preferably, the forming of the base film includes performing the first PVD method by changing the angle to a plurality of angles continuously.

According to this aspect, when the oblique deposition method is performed as the first PVD method in the forming of the base film, the inorganic material can be deposited on the outermost surface of the laminated structure on the substrate surface where the pixel electrode is formed as the electrode such that a portion blocked by the step is not generated with respect to the progressing direction of the vapor flow of the inorganic material to the substrate surface, on the outermost surface of the above-mentioned laminated structure. Therefore, the base film can be formed by arranging the columnar structures made of the inorganic materials even in the vicinity of the step of the outermost surface of the above-mentioned laminated structure. In addition, the base film can be formed as a dense film by increasing the thickness of the film in a state in which the surface of the base film is flat.

Preferably, the first PVD method in the forming of the base film and the second PVD method in the forming of the alignment film are performed by an oblique deposition method.

According to this aspect, the vapor flow of the inorganic material comes into contact with the outermost surface of the laminated structure in the forming of the base film or the vapor flow of the inorganic material comes into contact with the surface of the base film in the forming of the alignment film, so that the base film or the alignment film can be formed by arranging the columnar structures made of the inorganic materials on the substrate surface.

Preferably, the first PVD method in the forming of the base film and the second PVD method in the forming of the alignment film are performed by an ion beam sputtering method.

According to this aspect, similarly to a case in which the first PVD method and the second PVD method are performed by the oblique deposition method, the angle which the scattering direction of the inorganic material forms with respect to the substrate surface can be adjusted and the film forming condition, such as the film forming speed of the inorganic material, can be adjusted, so that the base film or the alignment film can be formed by arranging the columnar structures made of the inorganic materials on the substrate surface.

Preferably, the forming of the electrodes includes forming pixel electrodes as the electrodes; forming wiring lines or driving elements that drive the pixel electrodes; and forming interlayer insulating films that insulates the wiring lines or the driving elements and the pixel electrodes.

According to this aspect, it is possible to prevent the alignment defects from being generated in the alignment film formed on the pixel electrodes provided on one substrate of the pair of substrates. In addition, it is possible to prevent the pixel electrodes from coming into contact with the electro-optical material. In addition, it can be prevented that the moisture absorbed into the alignment film having the small thickness and density is dispersed into the alignment film and then permeates into the pixel electrodes or the like.

According to a second aspect of the invention, a method of manufacturing an electro-optical device, the electro-optical device having a pair of substrates with an electro-optical material interposed therebetween, the method includes: forming a light-shielding film on a substrate surface of one substrate of the pair of substrates opposite to the electro-optical material so as to define an opening region for every pixel and forming a counter electrode on the light-shielding film so as to be opposite to pixel electrodes formed on the other substrate of the pair of substrates for every pixel; forming a base film of an alignment film made of an inorganic material on the counter electrode by performing a first PVD method while setting an angle which a scattering direction of the inorganic material forms with respect to the substrate surface to one value or a plurality of values such that the counter electrode does not generate a blocked portion at one location with respect to the scattering direction; and forming the alignment film made of the inorganic material on the base film by fixing the angle to a predetermined value different from the value set by the first PVD method or performing a second PVD method with a film forming condition different from the first PVD method.

In the method of manufacturing an electro-optical device according to the second aspect, the light-shielding film is formed in a stripe or matrix shape on the substrate surface of one substrate of the pair of substrates opposite to the electro-optical material so as to define an opening region for every pixel. In addition, the counter electrode opposite to the plurality of pixel electrodes is formed on the light-shielding film provided on the other substrate. The step generated according to the thickness of the light-shielding film in a direction vertical to the substrate surface is formed on the surface of the counter electrode.

Similarly to the method of manufacturing an electro-optical device according to the first aspect, the first PVD method is performed with respect to the substrate surface of the other substrate where the counter electrode is formed so as to form the base film in the forming of the base film, and the alignment film is formed on the base film in the forming of the alignment film. The columnar structures can be arranged on the substrate surface even in the vicinity of the step on the surface of the counter electrode without a gap during the forming of the base film. Thereby, the step generated on the surface of the base film to correspond to the step generated on the surface of the counter electrode becomes decreased as compared with the step on the surface of the counter electrode or enters in a flat state. Therefore, during the forming of the alignment film, the columnar structures can be uniformly arranged on the base film such that they form a predetermined angle with respect to the substrate surface. Alternatively, even though the surface step due to the light-shielding film is not improved by the base film, the defects generated due to the surface step is compensated by the base film.

Therefore, in the method of manufacturing the electro-optical device according to the second aspect, it is possible to prevent the alignment defect from being generated at the portion of the alignment film corresponding to the step on the surface of the counter electrode provided on the other substrate of the pair of substrates. In addition, since the thickness of the base film can be increased so that the base film can be formed with a dense film, it is possible to prevent the counter electrode from coming into contact with the electro-optical material. In addition, it can be prevented that the moisture absorbed into the alignment film having the small thickness and density is dispersed from the alignment film to the base film and then permeates into the counter electrode or the like. Therefore, in the method of manufacturing the electro-optical device according to the second aspect as described above, the same advantages and effects as the method of manufacturing an electro-optical device according to the first aspect can be obtained.

According to a third aspect of the invention, an electro-optical device includes: a pair of substrates with an electro-optical material interposed therebetween; electrodes that are formed on a substrate surface of at least one substrate of the pair of substrates opposite to the electro-optical material so as to apply a predetermined voltage to the electro-optical material for every pixel; a base film that is formed of an inorganic material on the electrodes by performing a first PVD method while setting an angle which a scattering direction of the inorganic material forms with respect to the substrate surface to one value or a plurality of values such that the electrode does not generate a blocked portion at one location with respect to the scattering direction; and an alignment film that is formed of an inorganic material on the base film by fixing the angle to a predetermined value different from the value set by the first PVD method or performing a second PVD method with a film forming condition different from the first PVD method.

Since the electro-optical device is manufactured by the method of manufacturing an electro-optical device according to the first aspect, high quality image display can be performed, and the life span can be increased.

According to a fourth aspect of the invention, an electronic apparatus includes the above-mentioned electro-optical device.

Since the electronic apparatus has the above-mentioned electro-optical device, the high quality image display can be stably performed and the life span can be increased. The electronic apparatus according to this aspect can achieve various electronic apparatuses, such as a projection display device, a television, a cellular phone, an electronic note, a word processor, a view-finder-type or monitor-direct-view-type video tape recorder, a workstation, a video phone, a POS terminal, a touch panel or the like. In addition, the electronic apparatus according to this aspect can achieve an electrophoresis device such as an electronic paper, an electronic emission device (field emission display and conduction electron-emitter display), and a DLP (digital light processing), which is an apparatus using the electrophoresis device and the electron emission device.

According to a fifth aspect of the invention, a device for manufacturing an electro-optical device, the electro-optical device having a pair of substrates with an electro-optical material interposed therebetween, includes: a first unit that forms electrodes on a substrate surface of at least one substrate of the pair of substrates opposite to the electro-optical material so as to apply a predetermined voltage to the electro-optical material for every pixel; a second unit that forms a base film of an alignment film made of an inorganic material on the electrodes by performing a first PVD method while setting an angle which a scattering direction of the inorganic material forms with respect to the substrate surface to one value or a plurality of values such that the electrode does not generate a blocked portion at one location with respect to the scattering direction; and a third unit that forms the alignment film made of the inorganic material on the base film by fixing the angle to a predetermined value different from the value set by the first PVD method or performing a second PVD method with a film forming condition different from the first PVD method.

According to this aspect, similarly to the method of manufacturing an electro-optical device according to the first aspect, the electro-optical device, in which the high quality image display can be performed and the life span can be increased, can be manufactured, and the yield can be increased.

The effects and advantages of the invention will be apparent from embodiments described below.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, the preferred embodiments of the invention will be described in more detail with reference to the accompanying drawings. The embodiments described below exemplify a TFT-active-matrix driven liquid crystal device of a driving circuit built-in type, which is an example of an electro-optical device of the invention.

1: Structure of an Electro-Optical Device

First, the overall structure of the electro-optical device according to the present embodiment will be described with reference to FIGS. 1 and 2.

Figure 1:
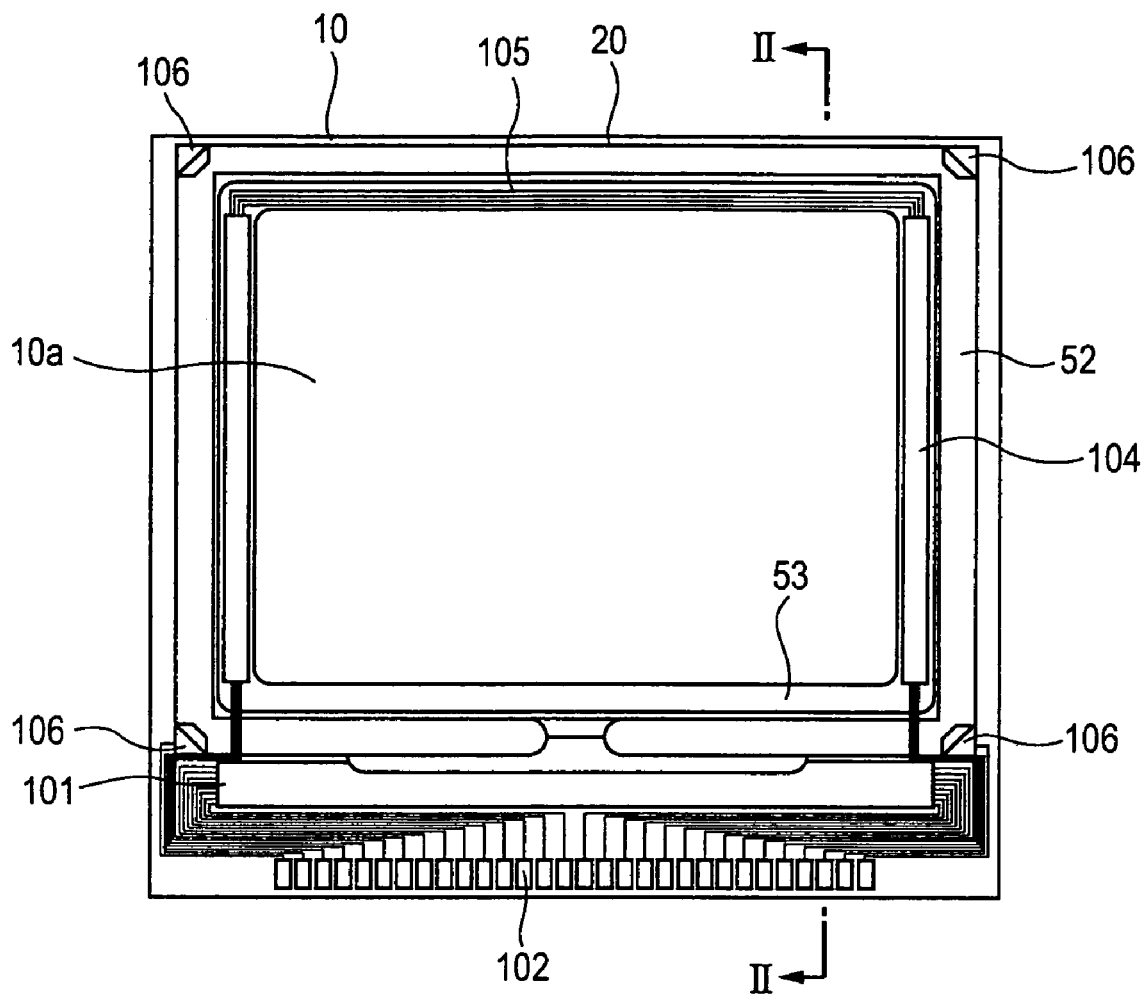
FIG. 1 is a plan view showing the overall structure of an electro-optical device according to an embodiment of the invention.

FIG. 1 is a plan view of a TFT array substrate of the electro-optical device as seen from a counter substrate side together with individual constituent elements formed thereon. FIG. 2 is a cross-sectional view of the electro-optical device taken along the line II-II of FIG. 1. The scale of each layer or member has been adjusted in order to have a recognizable size in the drawings.

Figure 2:
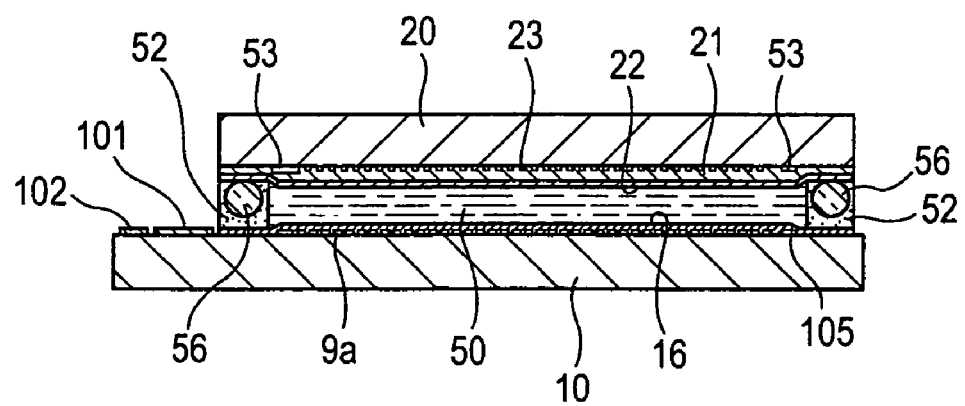
FIG. 2 is a cross-sectional view of the electro-optical device taken along the line II-II of FIG. 1.

As shown in FIGS. 1 and 2, in the electro-optical device according to the present embodiment, a TFT array substrate 10 and a counter substrate 20 are disposed opposite to each other. A liquid crystal layer 50 is sealed between the TFT array substrate 10 and the counter substrate 20. The TFT array substrate 10 and the counter substrate 20 are bonded to each other through a sealant 52, which is provided in a sealing region located around an image display region 10a.

The sealant 52 is formed of, for example, an ultraviolet curable resin or a thermosetting resin, or an ultraviolet curable/thermosetting resin in order to bond both substrates together. In a manufacturing process, the sealant 52 is coated on the TFT array substrate 10 and is then cured by means of ultraviolet irradiation, heating or the like. Further, a gap material 56, such as glass fibers or glass beads, for making a gap between the TFT array substrate 10 and the counter substrate 20 (a gap between the substrates) a predetermined amount is dispersed in the sealant 52. FIG. 2 shows a configuration in which the glass beads having substantially a spherical shape used as the gap material 56 are mixed in the sealant 52. In addition, the gap material 56 may be mixed in the sealant 52 and may be arranged in the image display region 10a or a peripheral region located around the image display region 10a.

In FIG. 1, a frame-shaped light-shielding film 53 having a light-shielding property, which defines a frame region of the image display region 10a, is provided at the counter substrate 20 side such that it is parallel to the inside of the sealing region where the sealant 52 is disposed. However, a portion or all of the frame-shaped light-shielding film 53 may be provided at the TFT array substrate 10 side as a built-in light-shielding film.

Along one side of the TFT array substrate 10, a data line driving circuit 101 and external circuit connecting terminals 102 are provided in a region located outside the sealing region of the peripheral region where the sealant 52 is disposed. Further, scanning line driving circuits 104 are provided along two sides adjacent to the one side so as to be covered with the frame-shaped light-shielding film 53. Moreover, a plurality of wiring lines 105 for connecting the two scanning line driving circuits 104 provided at both sides of the image display region 10a are provided along one remaining side of the TFT array substrate 10 so as to be covered with the frame-shaped light-shielding film 53.

In addition, upper and lower conductive materials 106 serving as upper and lower conductive terminals between both substrates are disposed at four corners of the counter substrate 20. On the other hand, upper and lower conductive terminals are provided in regions of the TFT array substrate 10 opposite to these corners. Thereby, the TFT array substrate 10 and the counter substrate 20 can be electrically connected to each other.

In FIG. 2, on the TFT array substrate 10 is formed a laminated structure in which pixel switching TFTs (thin film transistors) serving as driving elements or wiring lines, such as scanning lines and data lines, are provided. A detailed configuration of the laminated structure is not shown in FIG. 2. However, on a top layer of the laminated structure, pixel electrodes 9a made of transparent materials, such as an ITO (indium tin oxide), are formed in an island shape in a predetermined pattern for every pixel. In addition, a base film of an alignment film 16 (not shown) is formed on the pixel electrodes 9a so as to bury the pixel electrodes 9a, and the alignment film 16, which is made of an inorganic material, such as, for example, silica ($SiO_2$), is provided on the base film.

On the other hand, on a surface of the counter substrate 20 opposite to the TFT array substrate 10, a light-shielding film 23 is provided. The light-shielding film 23 is formed in a matrix on the surface of the counter substrate 20 opposite to the TFT array substrate, in plan view. In the counter substrate 20, the light-shielding film 23 defines a non-opening region, and a region separated by the light-shielding film 23 becomes an opening region. Further, the light-shielding film 23 may be formed in a stripe, and the light-shielding film 23 and various elements such as the data lines provided at the TFT array substrate 10 side may define the non-opening region.

In addition, a counter electrode 21 made of a transparent material, such as an ITO, is formed on the light-shielding film 23 so as to be opposite to the plurality of pixel electrodes 9a. In addition, in order to perform color display in the image display region 10a, a color filter (not shown in FIG. 2) may be provided on the light-shielding film 23 in a region including a portion of the opening region and the non-opening region.

An alignment film 22 made of an inorganic material, such as, for example, silica ($SiO_2$), is formed on a laminated structure which is provided on the opposite surface of the counter substrate 20 and in which various elements are provided. Further, an alignment film may be formed on any one of the opposite surfaces of the TFT array substrate 10 and the counter substrate 20. In addition, any one of the alignment films 16 and 22 respectively provided at the TFT array substrate 10 side and the counter substrate 20 side may be formed of an organic alignment film obtained by subjecting an organic film formed of an organic material, such as polyimide, to a rubbing treatment. However, the inorganic alignment film has a characteristic that light resistance is excellent as compared with the organic alignment film. Therefore, in order to make the electro-optical device have a long life span, it is preferable that the inorganic alignment film be used.

In addition, the liquid crystal layer 50 is made of liquid crystal in which one kind or a plurality of kinds of nematic liquid crystal are mixed. The liquid crystal layer 50 has a predetermined alignment state between the pair of alignment films 16 and 22 in a state in which an electric field is not applied to the liquid crystal layer 50 from the pixel electrodes 9a. On the TFT array substrate 10, the alignment film 16 is continuously formed on the image display region 10a and a region extending from the image display region 10a to a sealing region of the peripheral region. In addition, the alignment film 22 is formed on the counter substrate 20 in the same manner that the alignment film 16 is formed on the TFT array substrate 10.

Further, on the TFT array substrate 10 shown in FIGS. 1 and 2, in addition to the data line driving circuit 101 and the scanning line driving circuits 104, the following circuits may be formed: a sampling circuit that samples image signals on image signal lines and supplies these sampled image signals to the data lines, a precharge circuit that supplies precharge signals with a predetermined voltage level to the plurality of data lines prior to the image signals, and an inspection circuit that inspects the quality and defects of the electro-optical device during production or at shipping.

Figure 3A:
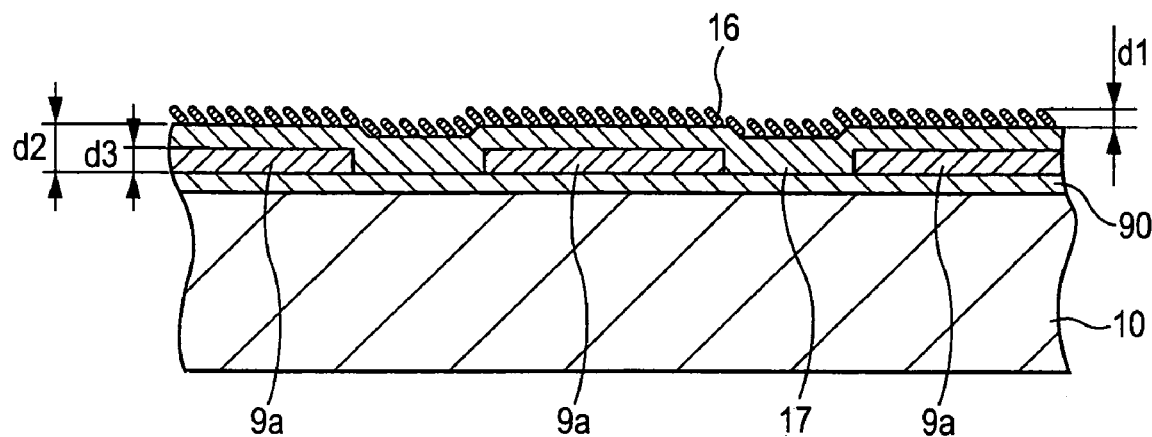
FIG. 3A is a cross-sectional view showing the structure of a TFT array substrate in more detail.
Figure 3B:
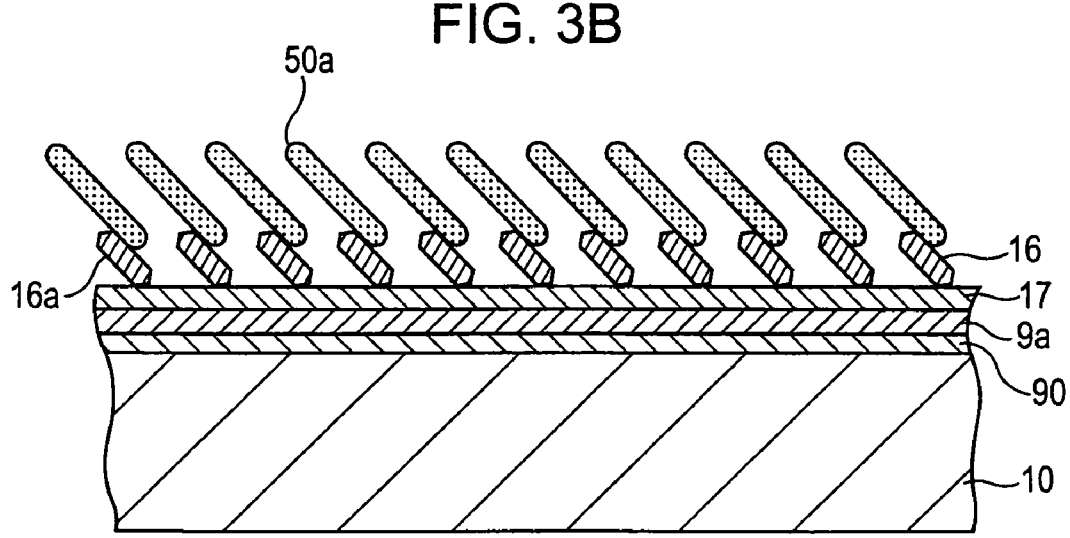
FIG. 3B is a schematic diagram illustrating alignment of liquid crystal through an alignment film.

FIG. 3A is a cross-sectional view showing the structure of the TFT array substrate 10 shown in FIG. 2 in more detail, and FIG. 3B is a schematic diagram illustrating alignment of liquid crystal by the alignment film 16 formed on the TFT array substrate 10.

In FIG. 3A, a laminated structure 90, in which various elements, such as TFTs, are provided, is formed on a substrate surface of the TFT array substrate 10 opposite to the liquid crystal layer 50, and the pixel electrodes 9a are formed on the top layer of the laminated structure 90 for every pixel.

A thickness d3 of each pixel electrode 9a in a direction vertical to the substrate surface of the TFT array substrate 10 is, for example, about 83 nm. A step is formed on an outermost surface of the laminated structure 90 in accordance with the thickness d3 of each pixel electrode 9a.

In FIG. 3A, the detailed configuration of the laminated structure 90 is not shown. However, in the laminated structure 90, a plurality of conductive films, which form at least a portion of the wiring lines such as the scanning lines or the driving elements such as the TFTs, are formed, and interlayer insulating films are provided so as to insulate the conductive films formed on different layers. In addition, the pixel electrodes 9a are formed in a state in which they are insulated between the layers through the wiring lines or the driving elements and the interlayer insulating films.

Therefore, when the step of the conductive film is generated on the surface of the bottom layer of the laminated structure 90 in accordance with the thickness in a direction vertical to the substrate surface of the TFT array substrate 10, the shape of the step is reflected to a shape of each surface of the upper layers, so that the step is generated on the surfaces of the pixel electrodes 9a or the surface of the interlayer insulating film exposed to the outermost surface of the laminated structure 90 between the pixel electrodes 9a provided on the substrate surface of the TFT array substrate 10 in plan view. As such, the detailed configuration of the step formed on the surface of the laminated structure 90 is not shown in FIGS. 3a and 3b.

On the TFT array substrate 10, the base film 17 of the alignment film 16 is formed on the respective pixel electrodes 9a. The base film 17 is formed of the same inorganic material as the alignment film 16 or an inorganic material different from the inorganic material of the alignment film 16. In addition, the base film 17 is formed such that a thickness d2 thereof is, for example, 120 to 130 nm in a direction vertical to the substrate surface of the TFT array substrate 10 so as to make the thickness of the base film 17 on the pixel electrode 9a have a predetermined value. In this case, the thickness of the base film 17 on the pixel electrode 9a is about 40 to 50 nm. In addition, the base film 17 is preferably formed of a dense film as compared with the alignment film 16.

The outermost surface of the laminated structure 90 is covered with the base film 17 formed in this way. In addition, the step generated on the outermost surface of the laminated structure 90 is also covered with the base film 17. Although the step to which the step generated on the outermost surface of the laminated structure 90 is reflected is generated on the surface of the base film 17, the step generated on the surface of the base film 17 becomes decrease as compared with the step generated on the outermost surface of the laminated structure 90. Thereby, the step generated on the outermost surface of the laminated structure 90 is markedly alleviated on the surface of the base film 17 to planarize it.

As shown in FIG. 3B, columnar structures 16a made of inorganic materials are arranged on the surface of the base film 17 at a predetermined angle with respect to the substrate surface of the TFT array substrate 10, and the alignment film 16 is formed such that a thickness d1 thereof is 20 to 30 nm in a direction vertical to the TFT array substrate 10. Furthermore, a thickness (d1+d2) obtained by adding the thickness d1 of the alignment film 16 to the thickness d2 of the base film 17 is preferable within a range of from 5 to 500 nm.

As described above, since the surface of the base film 17 has superior flatness, the columnar structures 16a can be uniformly arranged on the base film 17 such that the columnar structures 16a form a predetermined angle with respect to the substrate surface. The alignment film 16 formed in this way can align liquid crystal molecules 50a by a surface shape effect. In the present embodiment, since the uniform surface shape effect can be obtained on the alignment film 16, it is possible to prevent light from leaking due to alignment defects in the liquid crystal layer 50 in the electro-optical device, so that it is possible to perform high quality image display.

In addition, it is preferable that the base film 17 have a larger thickness d2 than the alignment film 16 and be formed of a dense film. By forming the base film in this way, it is possible to prevent the pixel electrode 9a from coming into contact with the liquid crystal. In addition, it can be prevented that moisture absorbed into the alignment film 16 having the small thickness and density is dispersed from the alignment film 16 into the base film 17 and is then permeated into the pixel electrode 9a or the like. Therefore, in the electro-optical device according to the present embodiment, water resistance and moisture resistance can be improved, so that the life span of the electro-optical device can be increased.

Further, although the step generated on the surface of the laminated structure 90 is not improved by the base film 17, since the step of the surface is covered with the base film 17, defects of the alignment film 16 caused by the step of the surface can be compensated by the base film 17. In other words, if denseness, water resistance or moisture resistance of the alignment film 16 are increased by the base film 17, even when a quality of a portion becoming not seen at the time of forming the alignment film 16 itself is lowered, a problem does not occur.

Figure 4:
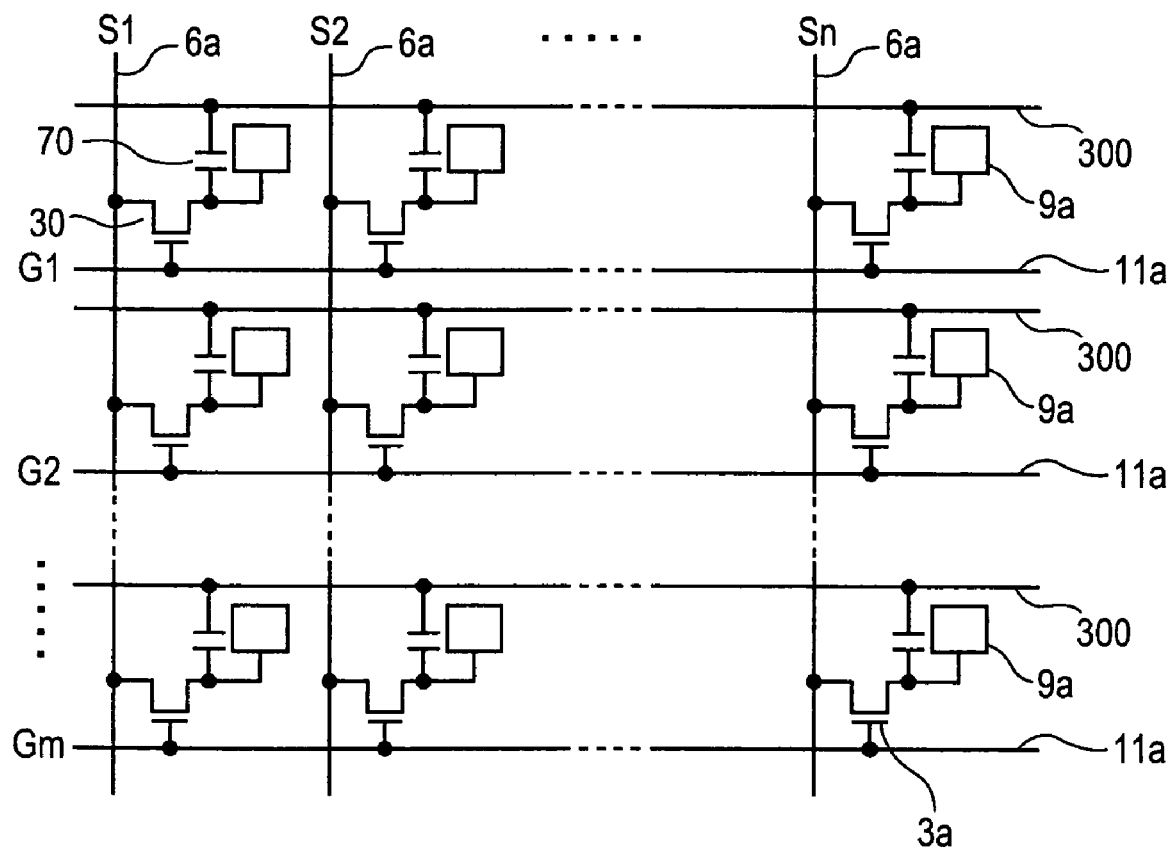
FIG. 4 is an equivalent circuit diagram of various elements and wiring lines in a plurality of pixels.

Next, the circuit configuration and operation of the electro-optical device constructed in this way will be described with reference to FIG. 4. FIG. 4 is an equivalent circuit diagram of various elements and wiring lines in the plurality of pixels which constitute an image display region of the electro-optical device and are formed in a matrix.

In FIG. 4, in each of the plurality of pixels which constitute the image display region 10a of the electro-optical device according to the present embodiment and are formed in a matrix, the pixel electrode 9a and the TFT 30 for switching the pixel electrode 9a are formed, and the data line 6a to which the image signal is supplied is electrically connected to a source of the TFT 30. Image signals S1, S2, . . . , and Sn written in the data lines 6a may be line-sequentially supplied in this order and may be supplied to a plurality of adjacent data lines 6a for every group.

In addition, a gate electrode 3a is electrically connected to a gate of the TFT 30, and scanning signals G1, G2, . . . , and Gm are line-sequentially supplied in a pulsed manner to the scanning lines 11a and the gate electrodes 3a with a predetermined timing. The pixel electrode 9a is electrically connected to a drain of the TFT 30, and the TFT 30 serving as a switching element is turned on for a predetermined period, so that the image signals S1, S2, . . . and Sn supplied through the data lines 6a can be written with a predetermined timing.

The image signals S1, S2, . . . , and Sn each having a predetermined level written into the liquid crystal which is an example of an electro-optical material through the pixel electrodes 9a are held for a predetermined period between the counter electrode 21 formed on the counter substrate 20 and the pixel electrodes 9a. Alignment or order of the liquid crystal molecules changes according to a voltage level applied to the liquid crystal, so that the light is modulated and gray scale display can be performed. In a normally white mode, the transmittance with respect to incident light decreases in accordance with a voltage applied for every pixel, and in a normally black mode, the transmittance with respect to the incident light increases in accordance with the voltage applied for every pixel. As a result, light having a contrast according to the image signal is emitted from the electro-optical device as a whole.

Here, in order to prevent the held image signal from leaking, a storage capacitor 70 is provided parallel to a liquid crystal capacitor formed between the pixel electrode 9a and the counter electrode 21. The storage capacitor 70 is disposed in a direction vertical to the scanning line 11a, and includes a fixed potential-side capacitor electrode and a capacitor electrode 300 fixed to a constant potential.

2: Method of Manufacturing an Electro-Optical Device

Hereinafter, a process of manufacturing the electro-optical device according to the present embodiment will be described with reference to FIGS. 5 to 10.

Figure 5:
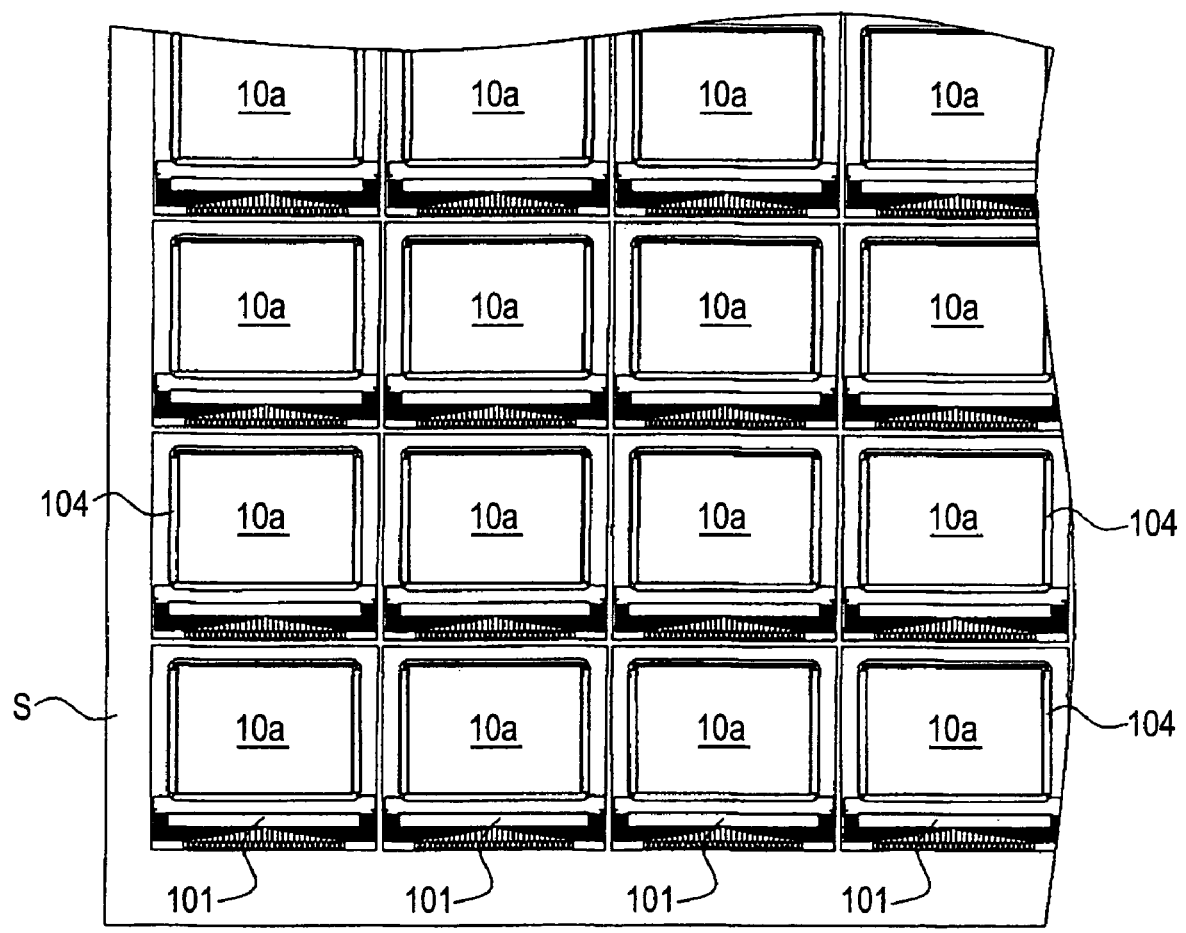
FIG. 5 is a partial plan view illustrating a case in which a plurality of the electro-optical devices according to the present embodiment are simultaneously formed on a glass substrate having a relatively large size.

FIG. 5 is a partial plan view illustrating a case in which a plurality of electro-optical devices according to the present embodiment are simultaneously formed on a glass substrate having a relatively large size. First, before each process of manufacturing the electro-optical device according to the present embodiment is described, it is assumed that the plurality of electro-optical devices according to the present embodiment are simultaneously formed on a glass substrate S having a relatively large size, as shown in FIG. 5. That is, the plurality of electro-optical device are arranged in a matrix on the glass substrate S and have the various elements described with reference to FIGS. 1 to 4 (for example, the TFTs 30, the scanning lines 11a, the data lines 6a, the scanning line driving circuits 104, the data line driving circuit 101 or the like), respectively. In addition, the glass substrate S shown in FIG. 5 corresponds to the TFT array substrate 10 shown in FIGS. 1 and 2.

FIG. 5 shows only the glass substrate S on which various elements provided at the TFT array substrate 10 side are formed. However, on another glass substrate not shown in FIG. 5, the counter electrodes 21 and the alignment films 22 are formed, and a plurality of counter substrates 20 are formed. In addition, the glass substrate S and another glass substrate not shown in FIG. 5 are disposed opposite to each other and are bonded to each other through a sealant 52 for every electro-optical device, and liquid crystal is sealed between the TFT array substrate 10 and the counter substrate 20. After that, the glass substrate S and another glass substrate not shown in FIG. 5 are cut, so that the electro-optical device shown in FIGS. 1 and 2 is plurally manufactured.

Figure 6:
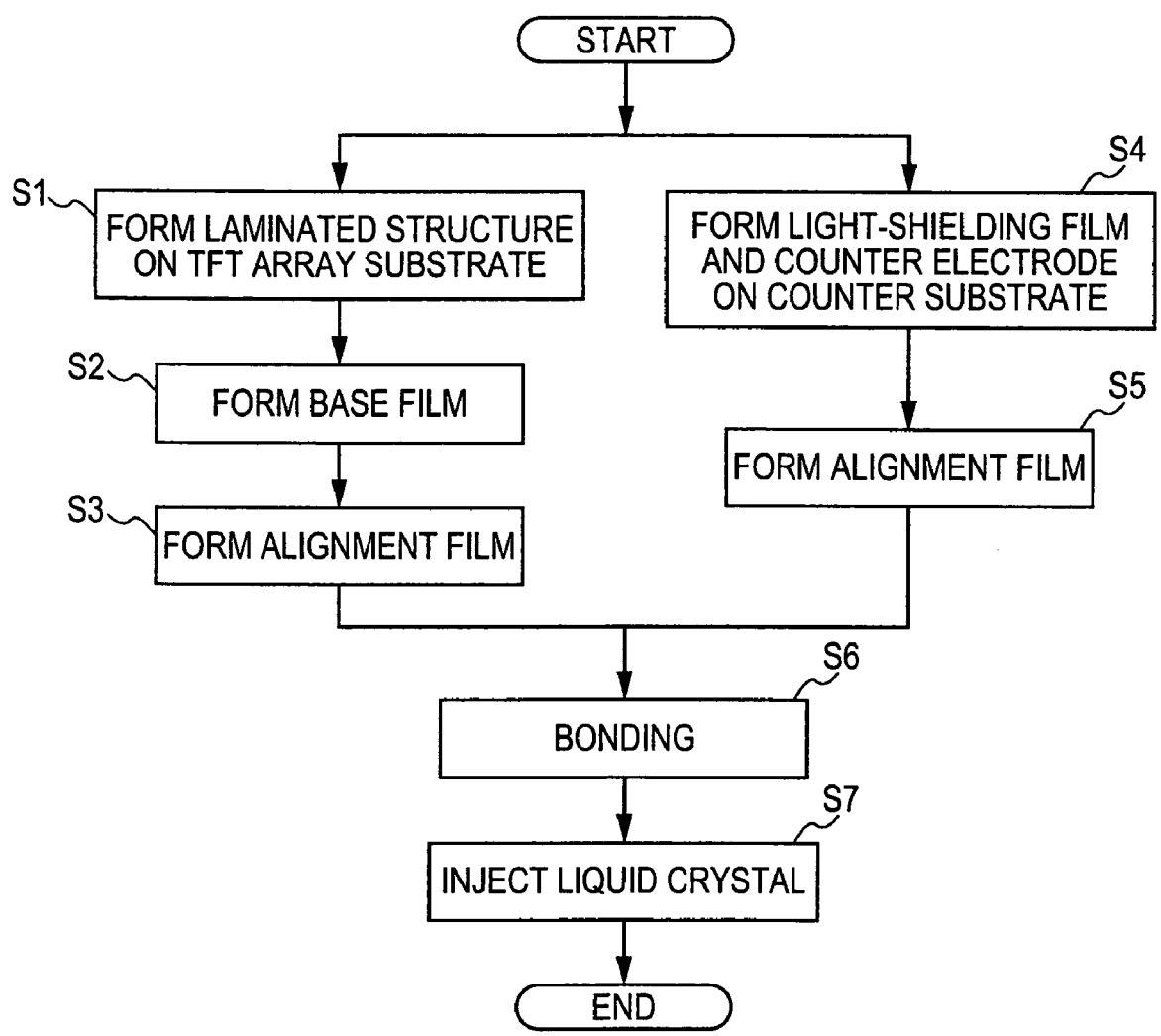
FIG. 6 is a flowchart illustrating each process of manufacturing the electro-optical device according to the present embodiment.
Figure 7:
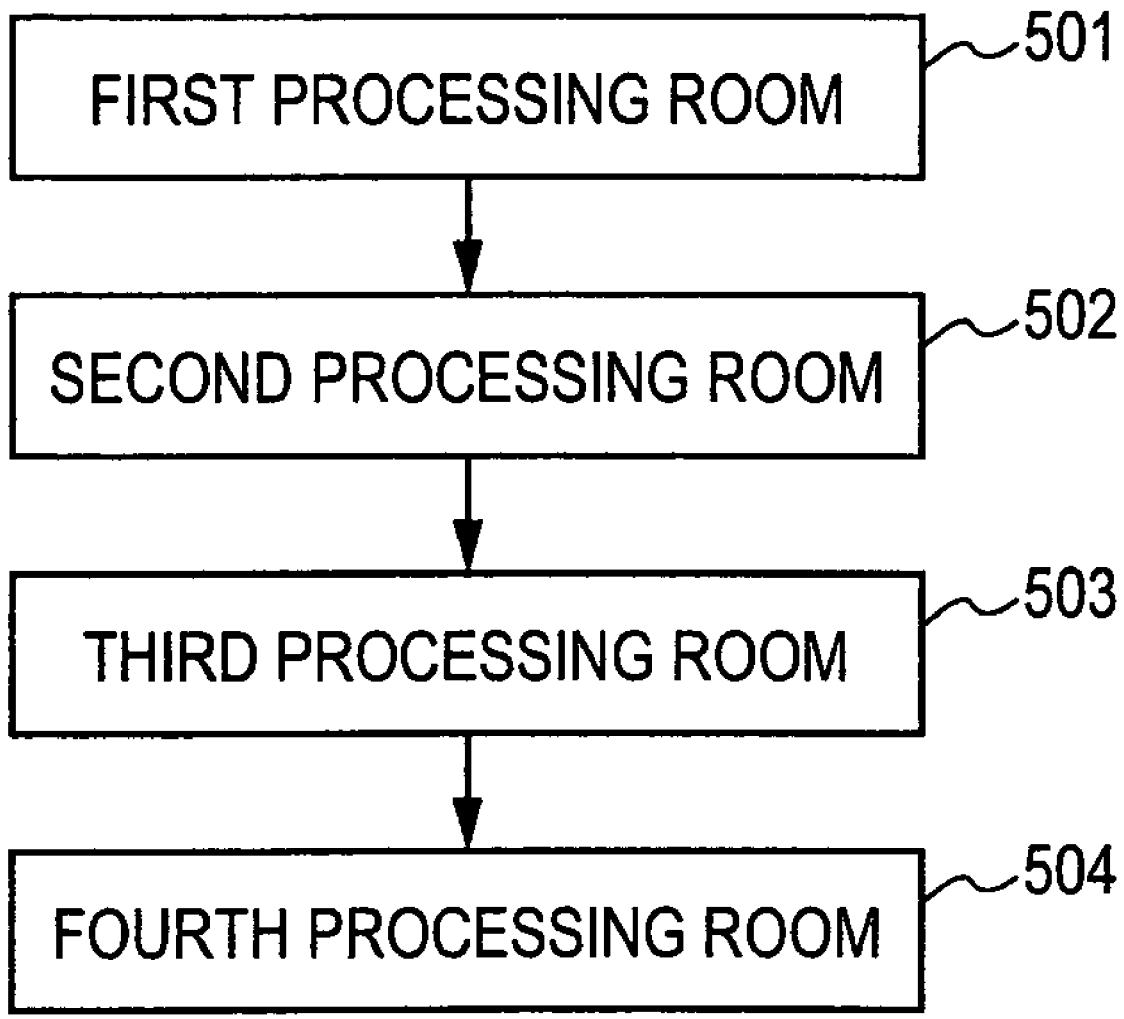
FIG. 7 is a schematic diagram illustrating a flow of each process in a manufacturing device which is used for manufacturing the electro-optical device.

On the premise described above, the process of manufacturing the electro-optical device according to the present embodiment will be described with reference to FIGS. 6 to 9. FIG. 6 is a flowchart illustrating the process of manufacturing the electro-optical device according to the present embodiment, and FIG. 7 is a schematic diagram illustrating a flow of each process in a manufacturing device used for manufacturing the electro-optical device. FIG. 8 is a cross-sectional view showing the structure of a cross section corresponding to FIG. 3A in each process of manufacturing the TFT array substrate 10, and FIG. 9A is a schematic diagram showing the structure of a second processing room shown in FIG. 7, and FIG. 9B is a schematic diagram showing an arrangement relationship between a scattering direction of an inorganic material and a substrate surface of the TFT array substrate 10.

Figure 8A:
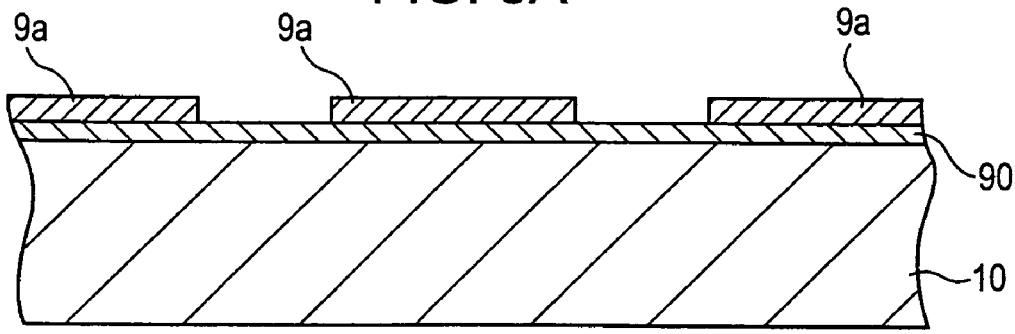
FIG. 8 is a cross-sectional view showing the structure of a cross section corresponding to FIG. 3A in each process of manufacturing the TFT array substrate.
Figure 9A:
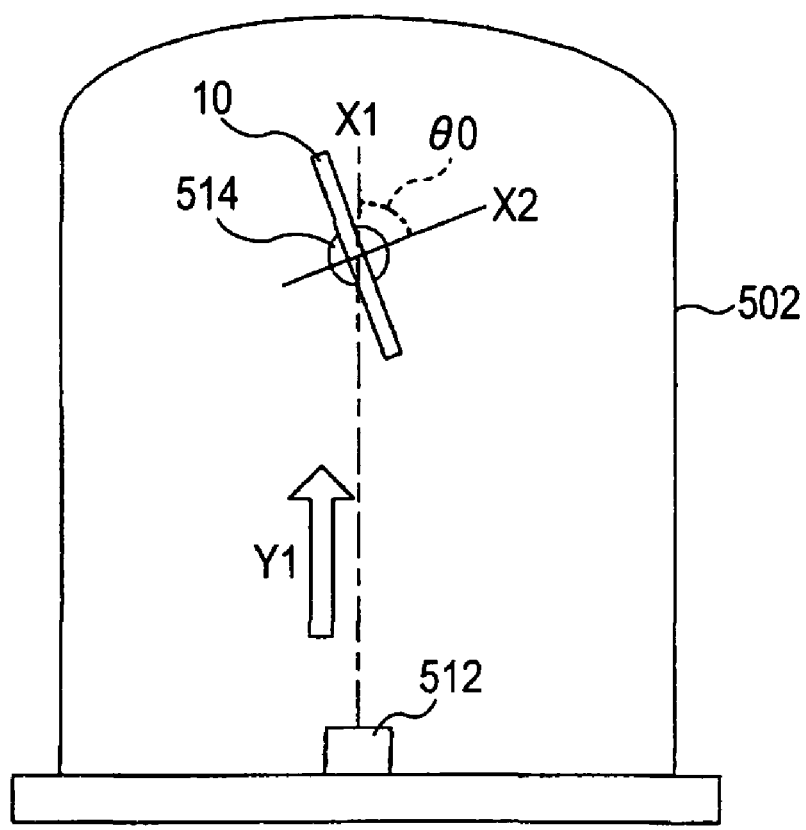
FIG. 9A is a diagram showing the structure of a second processing room.
Figure 9B:
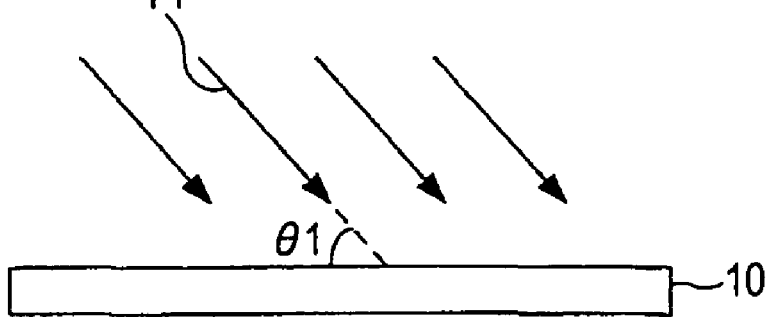
FIG. 9B is a schematic diagram showing an arrangement relationship between a scattering direction of an inorganic material and a substrate surface of the TFT array substrate.

First, in FIGS. 6 and 8A, in a first processing room 501 shown in FIG. 7, the pixel electrodes 9a are formed on an uppermost layer of the laminated structure 90 in which the data lines 6a, the scanning lines 11a, the TFTs 30 or the like are provided on the TFT array substrate 10 (step S1).

Next, the TFT array substrate 10 is transported from the first processing room 501 shown in FIG. 7 to the second processing room 502. In the second processing room 502, the TFT array substrate 10 is subjected to a treatment using a first PVD (physical vapor deposition) method, for example, an oblique deposition method or an ion beam sputtering method, and the base film 17 is formed on the substrate surface of the TFT array substrate 10 where the pixel electrodes 9a are formed (step S2).

As described below, similarly to the base film 17, the alignment film 16 is preferably formed using a second PVD method, for example, an oblique deposition method or an ion beam sputtering method. In the present embodiment, the base film 17 and the alignment film 16 are formed using the oblique deposition method.

As shown in FIG. 9A, in the second processing room 502, an evaporation source 512 for generating vapor flow of an inorganic material, such as silica ($SiO_2$), and a holding mechanism 514 for holding the TFT array substrate 10 are provided. In the second processing room 502, the TFT array substrate 10 is held by the holding mechanism 514 such that an angle $\theta 0$ formed by a reference line X1 for coupling the evaporation source 512 with a central position of the substrate surface of the TFT array substrate 10 and a straight line X2 orthogonal to the substrate surface of the TFT array substrate 10 has a predetermined value. Therefore, an angle $\theta 1$ formed by a progressing direction of the vapor flow of the inorganic material generated in the evaporation source 512 shown by arrows Y1 in FIGS. 9A and 9B, that is, a scattering direction of the inorganic material and the substrate surface of the TFT array substrate 10 where the base film 17 or the alignment film 16 are formed can be adjusted by changing the angle $\theta 0$.

Figure 8B:
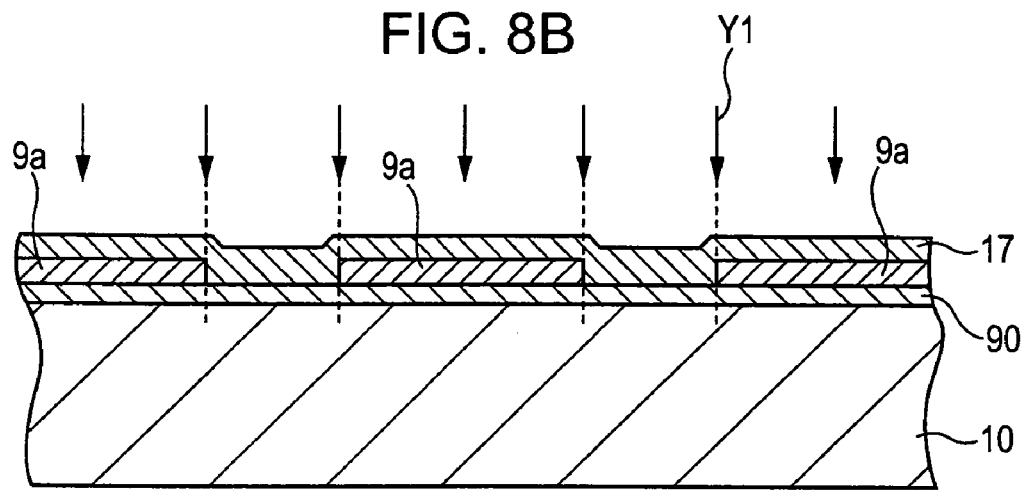

As shown in FIG. 8B, in the process of the step S2, on the outermost surface of the laminated structure 90 provided on the TFT array substrate 10, the angle $\theta 1$ is fixed to a right angle with respect to the progressing direction Y1 of the vapor flow of the inorganic material such that a portion blocked by the step is not generated at one location. In addition, in the second processing room 502, the vapor flow of the inorganic material contacts with the outermost surface of the laminated structure 90, so that the respective pixel electrodes 9a are buried and the base film 17 is formed.

At this time, similarly to the alignment film 16 described with reference to FIGS. 3A and 3B, the columnar structures made of the inorganic materials deposited on the substrate surface of the TFT array substrate 10 are arranged on the outermost surface of the laminated structure 90, so that the base film 17 is formed. In the base film 17, an angle, which the columnar structure forms with respect to the substrate surface, corresponds to the angle $\theta 1$, which the progressing direction Y1 of the vapor flow of the inorganic material forms with respect to the substrate surface of the TFT array substrate 10. Therefore, the angle $\theta 1$ is fixed to a right angle, so that the columnar structures are arranged in a state in which they are vertically erected with respect to the substrate surface. As a result, in the vicinity of the step of the laminated structure 90, the columnar structures can be arranged on the substrate surface without the gap, and a film forming speed of the base film 17 can be increased as compared with a film forming speed of the alignment film 16. In particular, the base film 17 is not related to an alignment function of the alignment film 16. Therefore, since a strict control does not need to be performed with respect to a growth direction of the base film 17 on the substrate surface of the TFT array substrate 10 in the same manner as the forming of the alignment film 16, a complicated manufacturing device is not necessary. As a result, the film forming speed increases, so that the base film 17 having a large thickness can be easily formed. In addition, the base film 17 can be cheaply formed of a film having a high density, that is, a dense film.

After that, the alignment film 16 is formed on the base film 17 in a state in which the TFT array substrate 10 is held in the second processing room 502 (step S3). At this time, the angle θ1 that the progressing direction Y1 of the vapor flow of the inorganic material forms with respect to the substrate surface of the TFT array substrate 10 where the base film 17 is formed is fixed to a predetermined value that the surface shape effect can be obtained so as to perform an alignment control in the alignment film 16. In this case, the angle θ1 is a predetermined value different from that used at the time of forming the base film.

Figure 10:
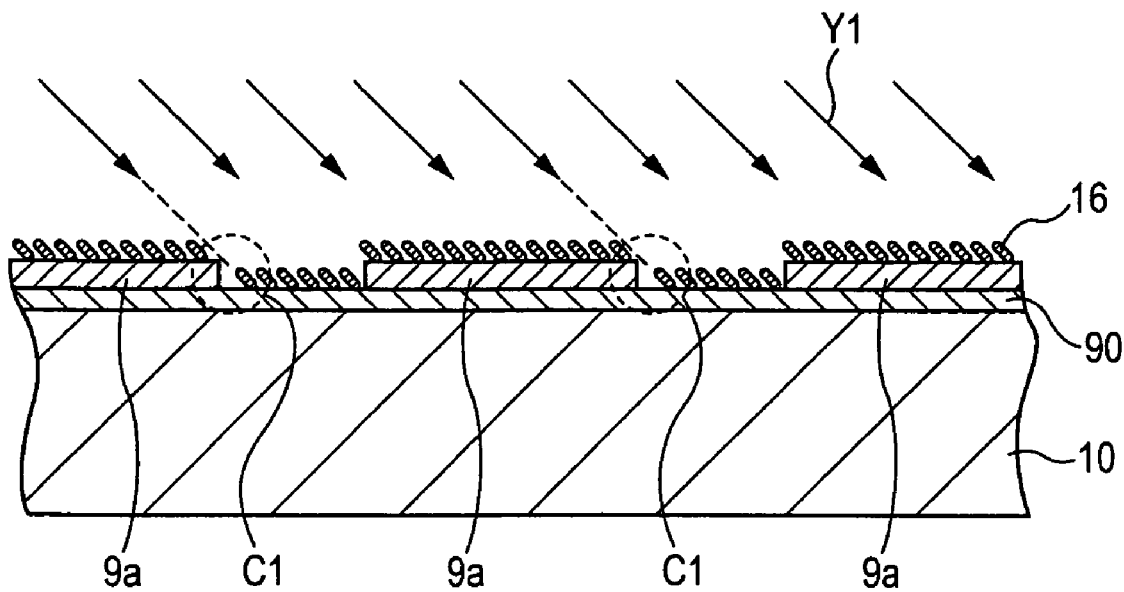
FIG. 10 is a cross-sectional view showing the structure of a cross section corresponding to FIG. 3A with respect to a comparative example according to a step S3 in the process of manufacturing the electro-optical device according to the present embodiment.

FIG. 10 is a cross-sectional view showing the configuration of the cross section corresponding to FIG. 3A, which is a comparative example related to the process of the step S3. When the alignment film 16 is formed while the base film 17 is not formed, the outermost surface of the laminated structure 90 comes into contact with the vapor flow of the inorganic material. At this time, on the outermost surface of the laminated structure 90 are generated portions C1 which are blocked by the step with respect to the progressing direction Y1 of the vapor flow. As a result, in these portions C1, it may be difficult for the inorganic materials to be deposited or the inorganic materials may not be deposited.

Figure 8C:
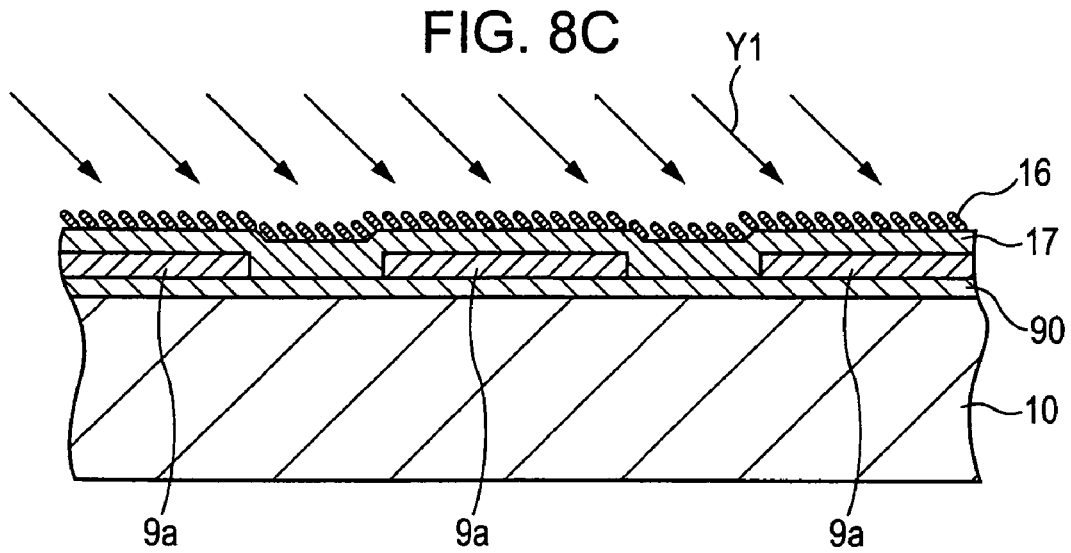

In contrast, in the present embodiment, as described above, the surface of the base film 17 can become flat because the step does not exist or is small on the surface of the base film 17. Therefore, as shown in FIG. 8C, when the surface of the base film 17 comes into contact with the vapor flow of the inorganic material, it can be prevented that the portion blocked by the step with respect to the progressing direction Y1 of the vapor flow is generated on the surface of the base film 17. Therefore, as described above, the columnar structures 16a of the inorganic materials can be uniformly arranged on the base film 17. In the alignment film 16 formed in this manner, the gap between the columnar structures 16a becomes larger as compared with the base film 17, and the density of the alignment film 16 becomes smaller than that of the base film 17.

Here, it is preferable that the film forming speed of the alignment film 16 be smaller than that of the base film 17 in order to uniformly arrange the columnar structures 16a of the inorganic materials as described above. In this case, since the alignment film 16 may be formed to have the thickness capable of obtaining the surface shape effect, even when the film forming speed is small, the alignment film 16 can be easily formed.

In FIG. 6, in tandem with the process of manufacturing the TFT array substrate 10 from the steps S1 to S3, in a processing room not shown in FIG. 7, the laminated structure in which the light-shielding film 23 or the counter electrode 21 is provided is formed on the counter substrate 20 (step S4), and then the alignment film 22 is formed (step S5).

After that, the TFT array substrate 10 and the counter substrate 20 are transported in a third processing room 503 shown in FIG. 7, and in the third processing room 503, the side of the TFT array substrate 10 where the alignment film 16 is formed and the side of the counter substrate 20 where the alignment film 22 is formed are bonded to each other through the sealant 52 (step S6).

Next, the TFT array substrate 10 and the counter substrate 20 bonded to each other are transported in a fourth processing room 504 shown in FIG. 7, and the liquid crystal is injected between the TFT array substrate 10 and the counter substrate 20 in the fourth processing room 504 (step S7).

According to the manufacturing process of the present embodiment described above, it can be prevented that the pixel electrode 9a comes into contact with the liquid crystal, and it can be prevented that the moisture absorbed into the alignment film 16 having the small thickness and density is dispersed from the alignment film 16 to the base film 17 and is then permeated into the pixel electrodes 9a or the like. Therefore, it is possible to increase a yield in manufacturing the electro-optical device.

3: Modification

The modification of the process of manufacturing the electro-optical device according to the present embodiment will be described with reference to FIGS. 11 and 12.

Figure 11:
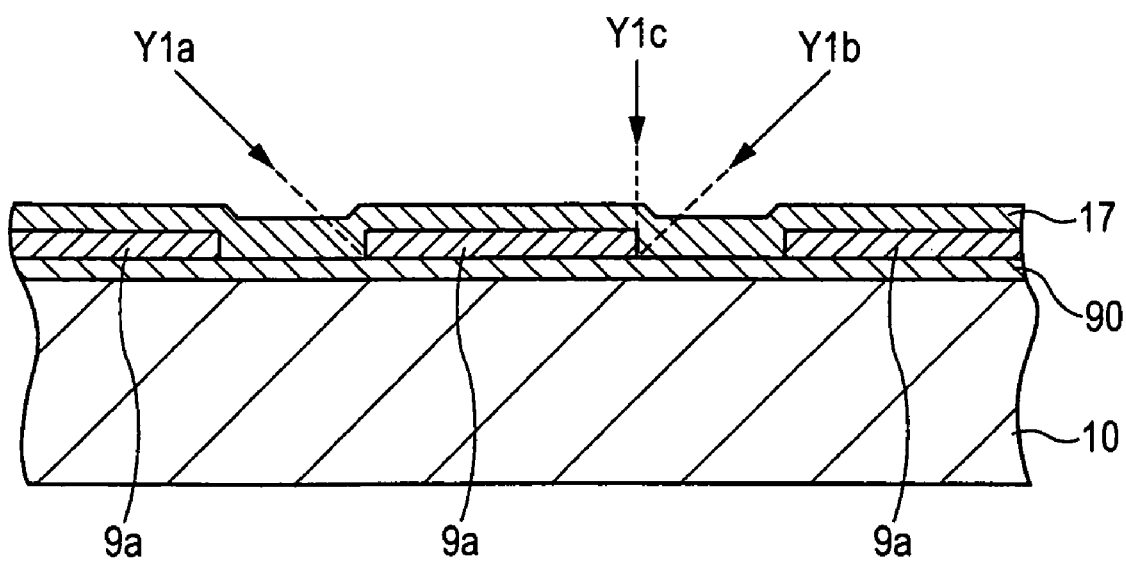
FIG. 11 is a cross-sectional view showing the structure of a cross section corresponding to FIG. 3A with respect to a modification according to a step S2 in the process of manufacturing the electro-optical device according to the present embodiment.

FIG. 11 is a cross-sectional view showing the structure of a cross section corresponding to FIG. 3A, which is a modification of the process of the step S2 in FIG. 6.

In the step S2, in the second processing room 502, the angle θ1 formed by the progressing direction Y1 of the vapor flow of the inorganic material and the substrate surface of the TFT array substrate 10 where the base film 17 or the alignment film 16 is formed may be continuously changed to a plurality of values to perform an oblique deposition method. Thereby, in FIG. 11, if considering one of the plurality of pixel electrodes 9a, in the substrate surface of the TFT array substrate 10, the progressing direction of the vapor flow of the inorganic material with respect to the pixel electrode 9a is changed to a direction shown by an arrow Y1c such that the angle formed by the progressing direction and the substrate surface of the TFT array substrate 10 is vertical or directions toward portions blocked by the step generated on the outermost surface of the laminated structure 90 by the pixel electrode 9a, as shown by arrows Y1a and Y1b. As such, the vapor flow of the inorganic material comes into contact with the outermost surface of the laminated structure 90 such that the portion blocked by the step with respect to the progressing direction of the vapor flow of the inorganic material is not generated on the outermost surface of the laminated structure 90 on the TFT array substrate 10, and the base film 17 is then formed. Therefore, the base film 17 can be formed by arranging the columnar structures of the inorganic materials even in the vicinity of the step of the outermost surface of the laminated structure 90.

In addition, as described above, the alignment film 22 can be formed at the counter substrate 20 side through the same sequence as the TFT array substrate 10 side. FIG. 12 is a cross-sectional view showing the structure corresponding to the cross section of the counter substrate 20 shown in FIG. 2 in more detail with respect to the process of manufacturing the counter substrate 20.

Figure 12A:
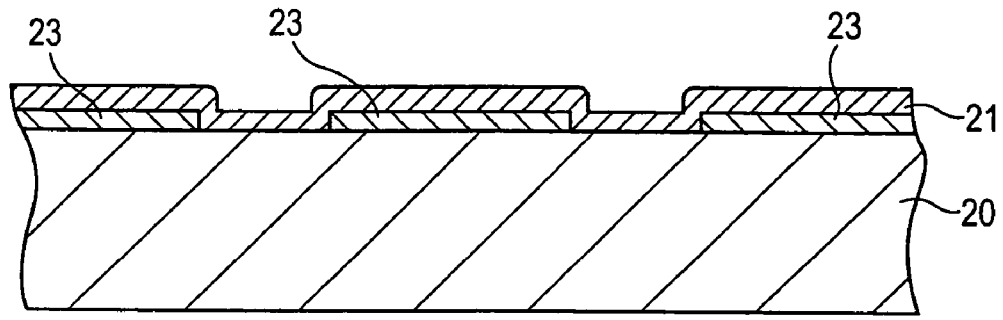
FIG. 12 is a cross-sectional view showing the structure of the counter substrate in the process of manufacturing the counter substrate in more detail.

In FIG. 12A, as described above, the laminated structure where the light-shielding films 23 or the counter electrode 21 is provided is formed on the substrate surface of the counter substrate 20 opposite to the liquid crystal layer 50. As shown in FIG. 12A, the step is generated on the surface of the counter substrate 21 becoming the outermost surface of the laminated structure in accordance with a thickness of the light-shielding film 23 in a direction vertical to the substrate surface of the counter substrate 20.

Figure 12B:
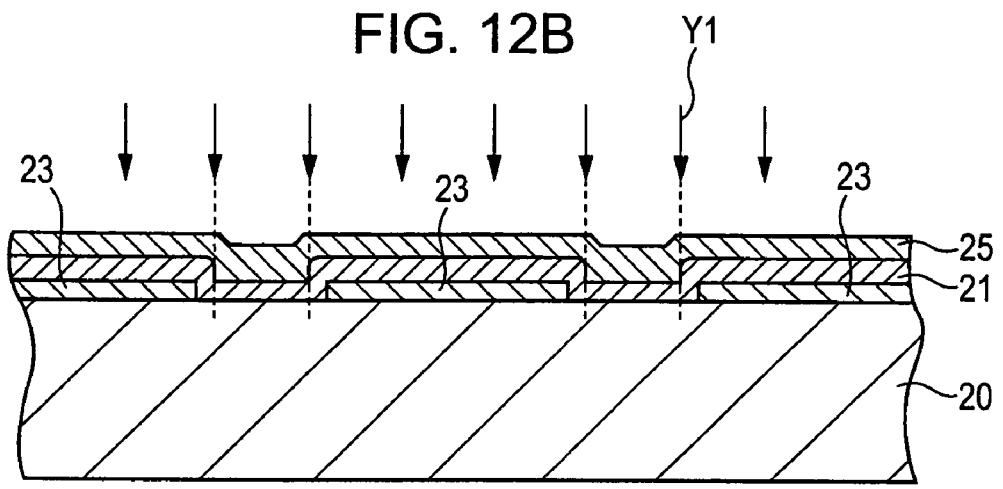

In FIG. 12b, the base film 25 of the alignment film 22 is formed on the counter electrode 21 through the same sequence as the above-mentioned step S2. At this time, the base film 25 can be formed by arranging the columnar structures even in the vicinity of the step provided on the surface of the counter electrode 21 without the gap. Therefore, the step generated on the surface of the base film 25 in accordance with to the step provided on the surface of the counter substrate 21 becomes smaller than the step provided on the surface of the counter electrode 21 and the base film 25 can be planarized.

Figure 12C:
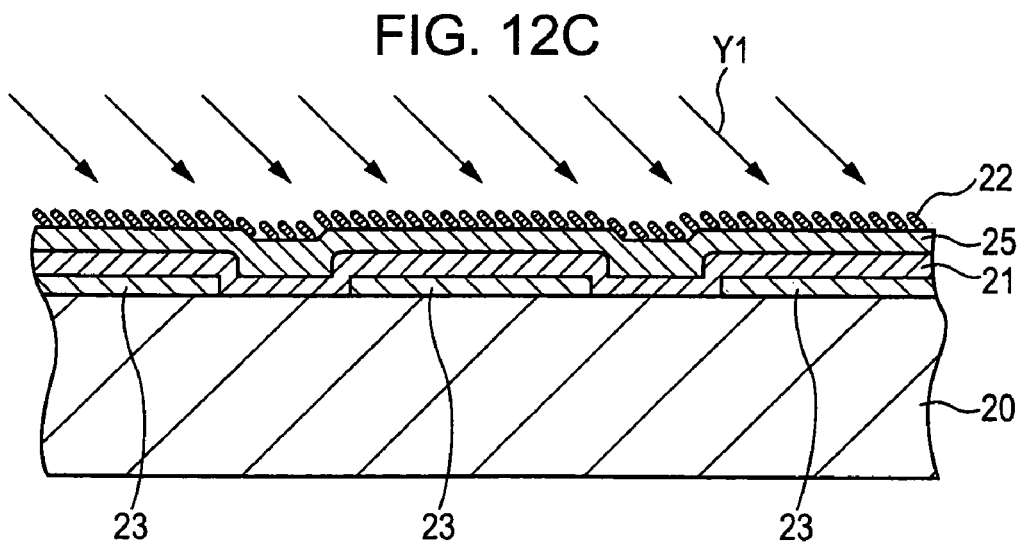

After that, as shown in FIG. 12C, the alignment film 22 is formed on the base film 25 through the same sequence as the above-mentioned step S3. The alignment film 22 can be formed by arranging the columnar structures uniformly on the base film 25 such that the columnar structures form a predetermined angle with respect to the substrate surface of the counter substrate 20 in the same manner as the alignment film 16 of the TFT array substrate 10 side.

As such, the alignment film 22 is formed at the counter substrate 20 side, so that it is possible to prevent the alignment defects in the alignment film 22 from occurring at the portion corresponding to the step provided on the surface of the counter electrode 21 on the counter substrate 20, and it is possible to prevent the counter electrode 21 from coming into contact with the liquid crystal. In addition, it can be prevented that the moisture absorbed into the alignment film 22 having the small thickness and density is dispersed from the alignment film 22 to the base film 25 and is then permeated into the counter electrode 21 or the like. Alternatively, even though the surface step of the counter electrode 21 due to the light-shielding film 23 is not improved by the base film 25, the defects of the alignment film 22 caused by the surface step can be compensated by the base film 25.

4. Electronic Apparatus

Next, a case will be described in which the above-mentioned liquid crystal device is applied to various electronic apparatuses.

4-1: Projector

Figure 13:
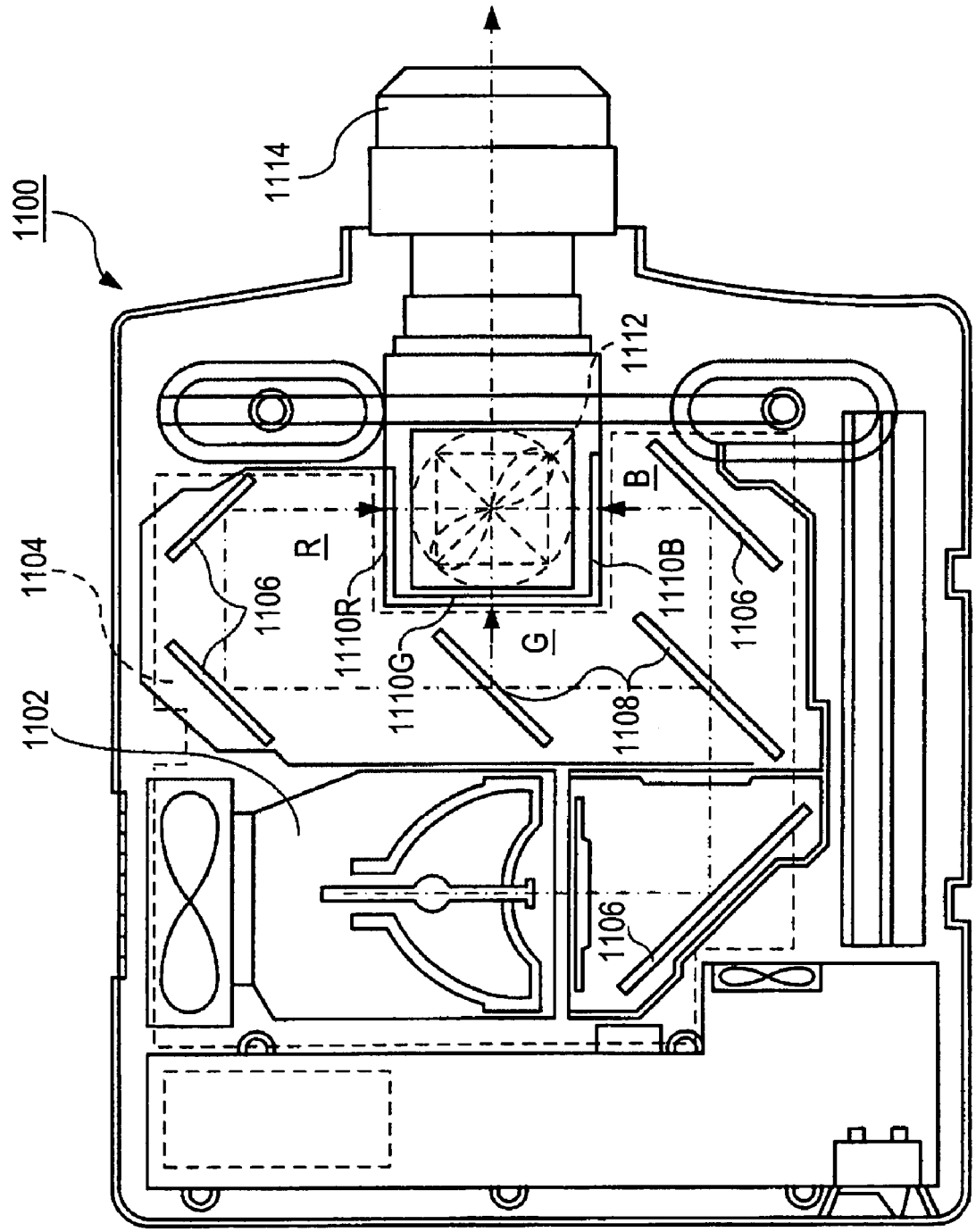
FIG. 13 is a plan view showing the structure of a projector, which is an example of an electronic apparatus to which a liquid crystal device is applied.

First, a projector using the above-mentioned liquid crystal device as a light valve will be described. FIG. 13 is a plan view illustrating a structure of the projector. As shown in FIG. 13, a lamp unit 1102 having a white light source such as a halogen lamp is provided inside a projector 1100. The projection light emitted from the lamp unit 1102 is separated into three primary colors of R (red), G (green), and B (blue) by four mirrors 1106 and two dichroic mirrors 1108 disposed in a light guide 1104, and is then incident on liquid crystal panels 1110R, 1110G, and 1110B serving as light valves corresponding to the respective primary colors.

The liquid crystal panels 1110R, 1110G, and 1110B have the same structure as the above-mentioned liquid crystal device, and are driven with primary color signals corresponding to the respective colors R, G, and B supplied from an external circuit (not shown) to external connecting terminals 102. The light components modulated by the liquid crystal panels are incident on a dichroic prism 1112 from three directions. In the dichroic prism 1112, the light components of R and B are refracted by 90 degrees while the light component of G goes straight. Therefore, the images of the respective colors are synchronized, and then a color image is projected onto a screen through a projection lens 1114.

Considering display images through the respective liquid crystal panels 1110R, 1110G, and 1110B, it is necessary that the display image through the liquid crystal panel 1110G be reversed in a horizontal direction with respect to the display images through the liquid crystal panels 1110R and 1110B.

Since the light components corresponding to the respective primary colors R, G, and B are incident on the liquid crystal panels 1110R, 1110G, and 1110B through the dichroic mirror 1108, it is not necessary to provide the color filters described above.

4-2: Mobile Computer

Figure 14:
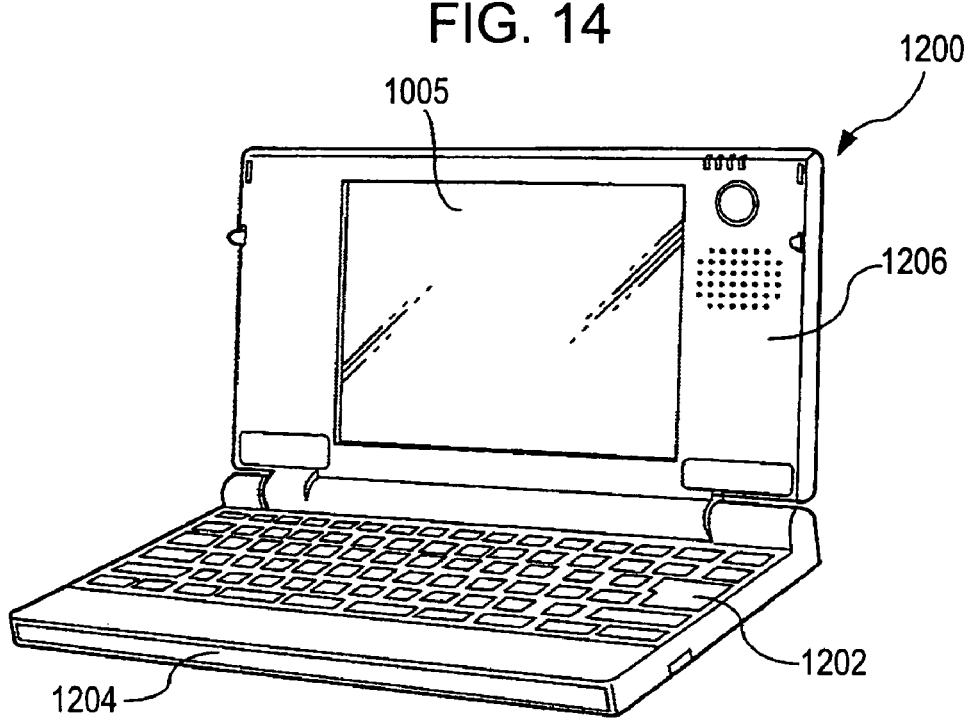
FIG. 14 is a perspective view showing the structure of a personal computer, which is an example of an electronic apparatus to which a liquid crystal device is applied.

Next, an example where the above-mentioned liquid crystal device is applied to a mobile personal computer will be described. FIG. 14 is a perspective view illustrating a structure of the personal computer. In FIG. 14, a computer 1200 includes a main body 1204 having a keyboard 1202 and a liquid crystal display unit 1206. In the liquid crystal display unit 1206, a backlight is additionally provided on a rear surface of the above-mentioned liquid crystal device 1005.

4-3: Cellular Phone

Figure 15:
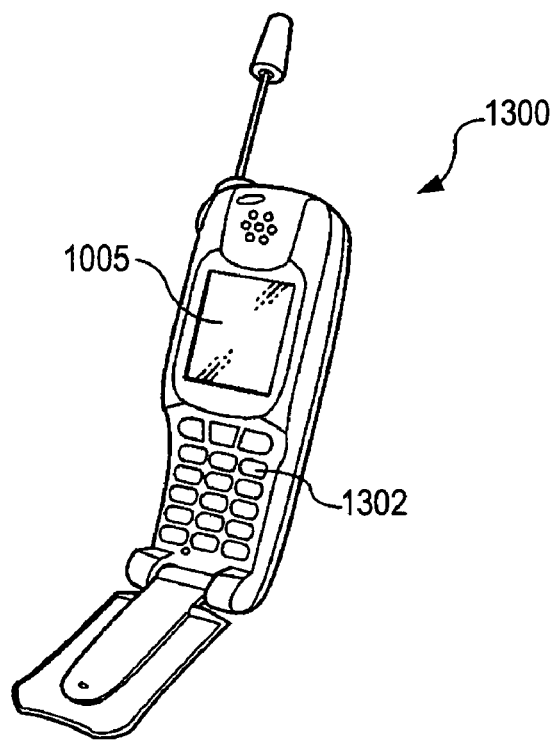
FIG. 15 is a perspective view showing the structure of a cellular phone, which is an example of an electronic apparatus to which a liquid crystal device is applied.

Next, an example where the above-mentioned liquid crystal panel is applied to a display unit of a cellular phone will be described. FIG. 15 is a perspective view illustrating a structure of the cellular phone. In FIG. 15, a cellular phone 1300 includes a plurality of operation buttons 1302 and a reflection-type liquid crystal device 1005. A front light unit is provided on a front surface of the reflection-type liquid crystal device 1005, if necessary.

Examples of the electronic apparatus may include a liquid crystal television, a view-finder-type or monitor-direct-view-type video tape recorder, a car navigation apparatus, a pager, an electronic note, a calculator, a word processor, a work station, a video phone, a POS terminal, an apparatus having a touch panel, and the like, in addition to the electronic apparatuses described with reference to FIGS. 13 to 15. It is needless to say that the invention can be applied to the various electronic apparatuses.

The invention is not limited to the above-mentioned embodiments, and various changes and modifications can be made without departing from the spirit and scope of the invention readable from the appended claims and the overall specification. In addition, the invention includes a method of manufacturing an electro-optical device, a device for manufacturing the same, an electro-optical device manufactured by the manufacturing method, and an electronic apparatus having the electro-optical device, in which various changes and modifications are made.

What is claimed is:

1. A method of manufacturing an electro-optical device, the electro-optical device having a pair of substrates with an electro-optical material interposed therebetween, the method comprising:

forming electrodes on a substrate surface of at least one substrate of the pair of substrates opposite to the electro-optical material so as to apply a predetermined voltage to the electro-optical material for every pixel;

forming a base film of an alignment film made of an inorganic material on the electrodes by performing a first Physical vapor deposition (PVD) method , wherein an angle which a movement direction or directions of the inorganic material forms with respect to the substrate surface is set to one angle or a plurality of angles such that the electrode does not generate a blocked out portion at one location with respect to the movement direction or directions; and forming the alignment film made of the inorganic material on the base film by fixing the angle to a predetermined value different from the value set by the first PVD method or performing a second PVD method with a film forming condition different from the first PVD method.

2. The method of manufacturing an electro-optical device according to claim 1, wherein the forming of the alignment film includes forming an alignment film having smaller density than the base film.

3. The method of manufacturing an electro-optical device according to claim 1, wherein the forming of the alignment film includes forming the alignment film at a lower speed than the forming of the base film.

4. The method of manufacturing an electro-optical device according to claim 1, wherein the forming of the alignment film includes forming the alignment film with the same inorganic material as the base film.

5. The method of manufacturing an electro-optical device according to claim 1, wherein the forming of the base film includes performing the first PVD method by setting the one angle or the plurality of angles to a right angle.

6. The method of manufacturing an electro-optical device according to claim 1, wherein the forming of the base film includes performing the first PVD method by changing the angle to a plurality of angles continuously.

7. The method of manufacturing an electro-optical device according to claim 1, wherein the first PVD method in the forming of the base film and the second PVD method in the forming of the alignment film are performed by an oblique deposition method.

8. The method of manufacturing an electro-optical device according to claim 1, wherein the first PVD method in the forming of the base film and the second PVD method in the forming of the alignment film are performed by an ion beam sputtering method.

9. The method of manufacturing an electro-optical device according to claim 1, wherein the forming of the electrodes includes:
   forming pixel electrodes as the electrodes;
   forming wiring lines or driving elements that drive the pixel electrodes; and
   forming interlayer insulating films that insulates the wiring lines or the driving elements and the pixel electrodes.

10. A method of manufacturing an electro-optical device, the electro-optical device having a pair of substrates with an electro-optical material interposed therebetween, the method comprising:
   forming light-shielding films on a substrate surface of one substrate of the pair of substrates opposite to the electro-optical material so as to define an opening region for every pixel and forming a counter electrode on the light-shielding films so as to be opposite to pixel electrodes formed on the other substrate of the pair of substrates for every pixel;
   forming a base film of an alignment film made of an inorganic material on the counter electrode by performing a first PVD method while setting an angle which a scattering direction of the inorganic material forms with respect to the substrate surface to one value or a plurality of values such that the counter electrode does not generate a blocked portion at one location with respect to the scattering direction; and
   forming the alignment film made of the inorganic material on the base film by fixing the angle to a predetermined value different from the value set by the first PVD method or performing a second PVD method with a film forming condition different from the first PVD method.

* * * * *